United States Patent
Wakamatsu et al.

[15] 3,683,720
[45] Aug. 15, 1972

[54] AUTOMATIC TRANSMISSION SYSTEM WITH TIME-DELAY CIRCUIT

[72] Inventors: Hisato Wakamatsu, Kariya; Takaaki Kato, Toyohashi; Mamoru Kawakubo; Katsunori Ito, both of Kariya, all of Japan

[73] Assignee: Nippondenso Kabushiki Kaisha, Kariya-shi, Japan

[22] Filed: June 23, 1970

[21] Appl. No.: 49,021

[30] Foreign Application Priority Data

June 26, 1969 Japan ..................44/50882

[52] U.S. Cl. ...................................................74/731
[51] Int. Cl. ...........................F16h 47/08, B60k 23/00
[58] Field of Search..........................74/731, 645, 866

[56] References Cited

UNITED STATES PATENTS

| 2,498,600 | 2/1950 | Brunken | 74/731 X |
| 2,529,129 | 11/1950 | Blair | 74/731 |
| 2,952,346 | 9/1960 | Costa et al. | 74/365 X |
| 3,147,595 | 9/1964 | Liang | 74/731 X |
| 3,267,762 | 8/1966 | Reval | 74/866 X |
| 3,448,640 | 6/1969 | Nelson | 74/866 |

Primary Examiner—Carlton R. Croyle
Assistant Examiner—Thomas C. Perry
Attorney—Cushman, Darby & Cushman

[57] ABSTRACT

An automatic transmission system wherein the amount of slip in a torque converter constituting a part of the transmission is utilized as a major factor for determining a shift point, and logic circuitry is incorporated to provide a means for this purpose and to issue a shift instruction which best suits the gear changing conditions, so that an actuator is brought into action by means of a hydraulic actuation circuit to accomplish the gear change, and a time-delay circuit is also incorporated in the said logic circuitry.

2 Claims, 28 Drawing Figures

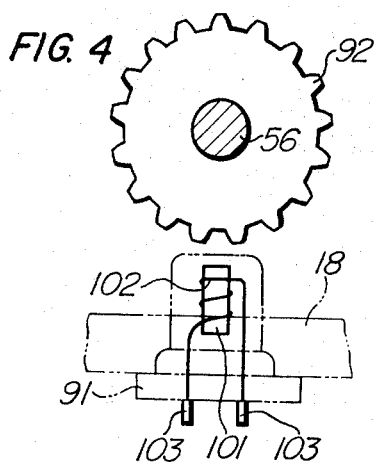
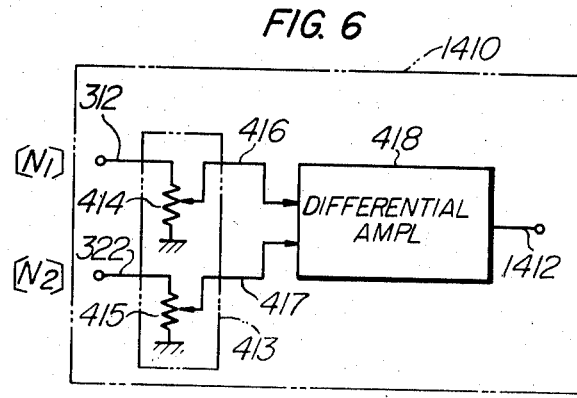
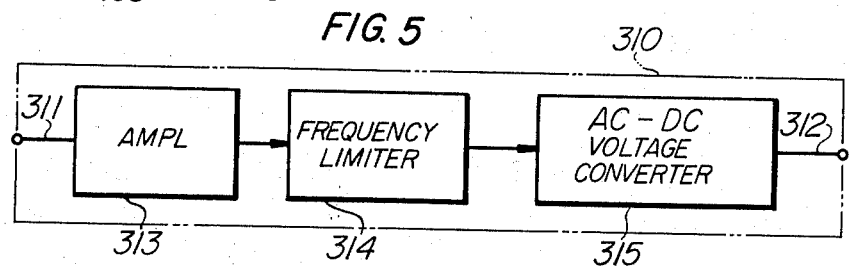
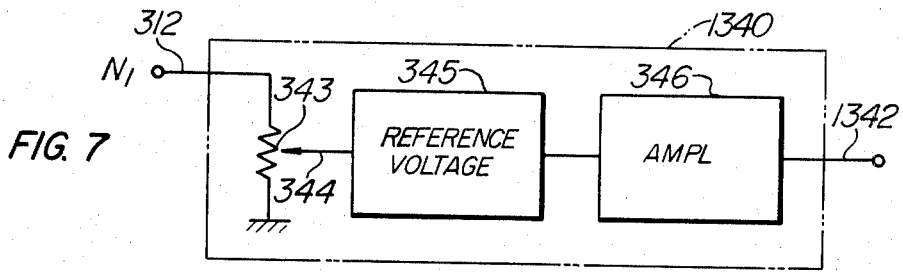
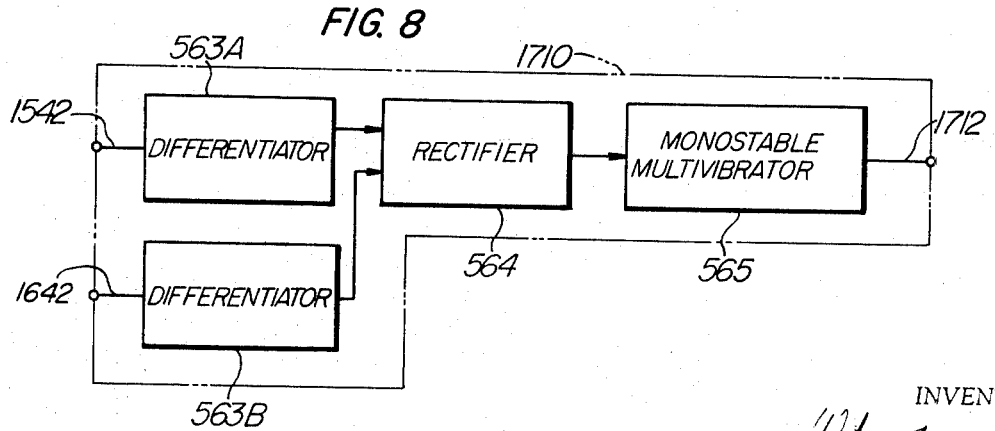

AUTOMATIC TRANSMISSION SYSTEM WITH TIME-DELAY CIRCUIT

BACKGROUND OF THE INVENTION

1. FIELD OF THE INVENTION

The present invention relates to transmissions for automobiles and the like and more particularly to an automatic transmission system comprising a fluid torque converter and a multi-range transmission gear.

2. DESCRIPTION OF THE PRIOR ART

In the conventional automatic transmissions used with ordinary passenger cars, the shift points are determined according to a signal representing the vehicle speed (which signal being derived from the output shaft of a multi-range transmission gear) or a signal representing the number of revolutions of an internal combustion engine which is a prime mover and the inlet manifold vacuum (boost pressure) of the internal combustion engine or the degree of depression of an accelerator pedal operated by the driver. These signals are provided in the form of oil pressures of varying values, and the shift points are determined and the valves are opened or closed according to the correlation between these two varying oil pressures so as to selectively operate by the oil pressures an actuator for multi-plate clutches, brake bands and the like. In other words, all the controls are effected by means of oil pressures, which means that the detected signals in the form of oil pressures generally tend to be subjected to errors and thus accurate controls cannot be expected. Consequently, the shift points also tend to be subjected to errors. Furthermore, since the hydraulic actuation circuit is generally complicated in construction, it is not an easy matter to provide the circuit with an improved function over what is presently available. For example, there is an inconvenience in that when a rapid speed reduction is required while driving up a hill at a relatively high speed, the releasing the pressure on the accelerator pedal first causes a shift to a high gear and then the vehicle slows down, so that if the accelerator pedal is redepressed to accelerate right after the speed reduction, it results in a shift to a lower gear ratio. Moreover, in spite of the fact that engine braking is required when the vehicle is descending a hill at a relatively high speed, the vehicle speed tends to increase thus preventing an automatic shift to the most appropriate low gear ratio, and in order to avoid this in such a case it is necessary to manually effect a shift to low gear.

On the other hand, when driving on a mountain road with many upgrades and downgrades, for example, in order to provide engine braking through an ordinary three-speed automatic transmission, the second gear is employed for descending hills. However, if the accelerator pedal is depressed to increase the output of an internal combustion engine in order to ascend an upgrade immediately after the vehicle has descended a downgrade, it gives rise to an inconvenience that the gear ratio is automatically upshifted to the top gear so that there is a shortage in the accelerating force required for climbing hills. In order to eliminate this inconvenience, that is, in order to ensure the required accelerating force for climbing, the gear ratio is downshifted again to the second gear.

These are the essential drawbacks attributable to the fact that the shift points are determined according to only the load condition of the internal combustion engine and the vehicle speed and that no internal conditions of the transmission are taken into consideration as controlling factors.

SUMMARY OF THE INVENTION

The present invention is characterized in that the amount of slip in a torque converter constituting an essential element of a transmission is utilized as a major factor for determining the shift points, and, as a means for this purpose, a logic circuit consisting of electronic circuitry is incorporated to provide a proper shifting instruction that best suits the shifting conditions, so that an actuator is operated through a hydraulic actuation circuit to accomplish the gear change, and at the same time a time-delay circuit is also incorporated in the logic circuit.

Accordingly, the present invention has for its object the provision of a transmission which incorporates various improvements in that a proper shifting function is ensured not only during normal driving, but also when the engine is used as a brake on decents, that the mechanical structure of the hydraulic system relating to the operation of the actuator and the like is simplified and that consequently shift points are prevented from being thrown off due to oil pressure changes.

Another object of the present invention is the provision of a transmission which is so designed that when the gear changing conditions are met to change from low to high gear as will be the case when the vehicle has just descended a hill and immediately thereafter there are provided other gear changing conditions to change the gear ratio into the low gear, the above-mentioned time-delay circuit is brought into operation so that despite the establishment of the first-mentioned shifting conditions a shift which would otherwise take place is delayed for a certain time to thereby eliminate those inconveniences that will be caused if such a shift were allowed to occur. This transmission has thus a more reliable and more sophisticated function.

The most important feature of the present invention resides in the arrangement of an automatic transmission with its principal part being divided broadly into a torque converter transmission, a hydraulic actuation circuit and an electronic logic circuit.

A further object of the present invention is to provide an automatic transmission system having a time-delay circuit comprising a transmission equipped with a torque converter including a torque converter pump coupled with the input shaft and a torque converter turbine coupled with the input shaft of a transmission gear, friction engaging means for attaining gear changing engagements of said transmission gear in said transmission, a hydraulic actuation circuit for controlling said friction engaging means including a gear change region establishing valve and a distributor valve for distributing working oil to said friction engaging means, a first detecting means for producing an electrical signal proportional to the rotational speed of the torque converter input shaft, a second detecting means for producing an electrical signal proportional to the rotational speed of either the input shaft or the output shaft of the transmission gear, an operational circuit adapted to receive as input signals the output electrical signals from said first and second detecting means so as to determine the ratio of the rotational speed of the torque converter input shaft to the rotational speed of either the input shaft or the output shaft of the transmission gear, a time-delay circuit for delaying the output signal of said operational circuit for a fixed time such that said output signal is delivered therethrough only when said output signal has lasted longer than said delay time, and means for actuating the distributor valve of said hydraulic actuation circuit by means of the output signal from said time-delay circuit.

Those effects which are attributable to the present invention will be summarized hereunder.

1. The automatic transmission according to the present invention is divided broadly into three sections of a torque converter transmission, a hydraulic actuation circuit and a logic circuit, and thus an actuator driving system is provided in which the hydraulic actuation circuit includes no logic circuit system. This simplifies the structure of the transmission and makes it smaller and easier to manufacture thereby achieving improved mass-productivity.

By using semiconductor elements for the logic circuit or integrating it into a miniaturized form, the automatic transmission system is made not only smaller and lighter in weight, but also more accurate and reliable in operation.

Since all the controls required for the transmission can be effected by simply providing it with small built-in revolution detecting means 70, 80 and 90 in addition to an oil pump 17 which is usually required with the conventional transmission systems, the transmission system of the present invention may be made still smaller and lighter in weight. These features of the reduced size and weight as well as the higher accuracy and reliability make the system of the present invention especially suited for use with vehicles, particularly automotive vehicles.

2. According to the present invention, logical operations are performed by the logic circuit on the amount of slip (slip ratio) in the torque converter as well as the number of revolutions of the internal combustion engine and the number of revolutions corresponding to the vehicle speed, so that a shift region is discriminated to thereby determine a shift point, and thus it is possible to make gear changes effective in which full use is made of the performance of the internal combustion engine, the driving conditions of the vehicle and the performance of the torque converter. This results in remarkable improvements in the gear changing function including that of making the automatic gear changes possible even under engine braking condition.

3. The torque converter transmission, the hydraulic actuation circuit and the electronic logic circuit are associated with one another through those units of simple construction, such as, speed sensitive elements (for example, electromagnetic pickups) which detect the number of revolutions of various shafts and solenoids. Furthermore, the transmission, hydraulic actuation circuit and electronic logic circuit are actuated by means of a solid mechanism, fluid mechanism and electronic mechanism respectively, so that there will be no unnecessary interferences among one another and they are stable in operation allowing no variations to take place.

4. An oil pressure source 250 for the hydraulic actuation circuit may be of a fixed oil pressure that suits an individual purpose and therefore it is simple in structure, superior in performance and highly stable in operation.

5. The electronic logic circuit operates on the gear changing condition signals in the form of "and" and "or" operations, so that stable shift signals can be realized.

6. The modification of a shift point (line) which has never been an easy matter with the conventional hydraulically controlled automatic transmission systems is now readily achieved. In other words, the automatic transmission system according to the present invention may be used with various kinds of vehicles designed for different purposes, since the shift points can be easily modified by merely changing the potentiometer setting. Thus, it is possible to meet the demand of many kinds of vehicles with a limited range of the automatic transmission system.

7. The driver of a vehicle can suitably change the shift points (lines) according to variations in the operating conditions of the vehicle thus providing an automatic transmission system that suits a wider range of operating conditions.

8. Since the time-delay circuit is incorporated to delay the output signal from a slip operating circuit for a fixed time so that this output signal is delivered through the time-delay circuit only when the output signal has been maintained longer than the delay time; when the gear changing conditions are provided to change the gear ratio from low to high gear and immediately thereafter the transmission is placed in condition to change to the low gear as will occur just after the vehicle has descended a hill under the low gear conditions utilizing the engine as a brake, a shift to the high gear is inhibited for a fixed time so that any inconvenience which would arise if the shift were effected, such as, a reduced acceleration efficiency during hill climbing immediately following a descent, is prevented thereby making it very easy to attain acceleration thereafter. In practice, this ensures the elimination of unnecessary gear changes as well as very good driving performance and very comfortable ride. In addition, the elimination of uneffective gear changes further results in a remarkably improved durability of the friction engaging means.

BRIEF DESCRIPTION OF THE DRAWINGS

FIG. 4 is a schematic diagram showing the structure of a revolution detector used in the control unit according to the embodiment of the present invention;

FIG. 5 is a block diagram showing the structure of a revolution operating circuit in the control unit.

FIG. 6 is a block diagram showing the structure of a slip operating circuit in the control unit;

FIG. 7 is a block diagram showing the structure of a revolution setting operating circuit in the control unit;

FIG. 8 is a block diagram showing the structure of a synchronized timing hold circuit in the control unit;

DESCRIPTION OF THE PREFERRED EMBODIMENTS

The structure and operation of the automatic transmission system according to the present invention will be explained in detail with reference to the preferred embodiments of the present invention.

STRUCTURE OF THREE FORWARD SPEED AUTOMATIC TRANSMISSION

An embodiment of the transmission will now be explained referring by way of a typical example to a three forward speed automatic transmission equipped with a torque converter.

Figure 1:
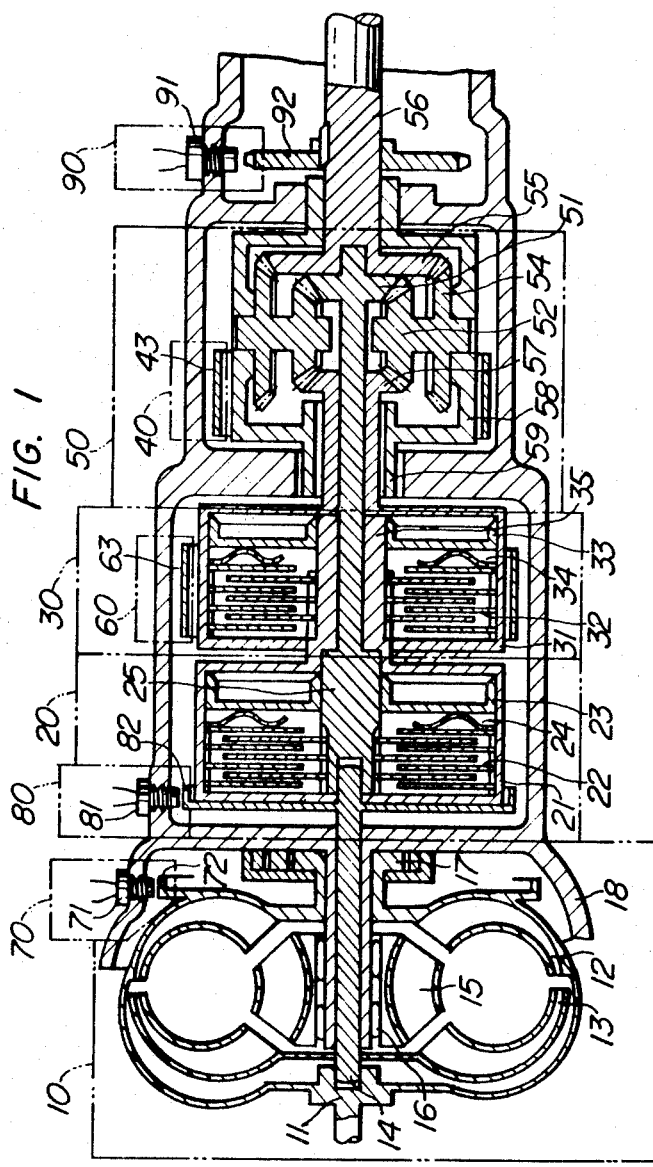
FIG. 1 is a typical sectional view showing an embodiment of the transmission incorporated in the system of the present invention.

Needless to say, the present invention is not limited to the three-speed transmission gear and it can be likewise embodied in an automatic transmission having more than three speeds or a two-speed automatic transmission. Referring now to FIG. 1, the torque converter automatic transmission having three forward speeds is composed of a torque converter 10, a front clutch 20, a rear clutch 30, a rear brake 40, a gear train 50 and a front brake 60.

At the input side of the torque converter 10, the revolving output shaft of an internal combustion engine which is not shown is directly coupled to a torque converter pump shaft 11 and the shaft 11 is directly coupled to a torque converter pump 12. The torque converter comprises the torque converter pump 12, a torque converter turbine 13 opposing to the pump 12 and a stator 15 disposed therebetween and provided with an one-way clutch 16. The operations of these members are well known and therefore will not be necessary to be explained in detail. The torque converter pump 12 delivers a circulating fluid flow and the torque converter turbine 13 transmits a turning effort to a turbine shaft 14 by virtue of the momentum of the circulating fluid flow.

In other words, the turning effort is transmitted between the torque converter pump and the torque converter turbine with a difference (slip ratio) in revolutions between the two members. With a small difference in the revolutions the torque transmitted will be small, while a large torque will be transmitted if there is a big difference in the revolutions. Thus, these members function to transmit varying turning efforts. The speed difference just referred to may be expressed in terms of the speed ratio (slip ratio).

The oil pressure pump 17 consists of a gear pump and it is directly coupled to the torque converter pump shaft 11 for the purposes which will be discussed later. The front clutch 20 comprises a clutch drum 21 which is integrally coupled with the torque converter turbine shaft 14, a multiple-plate clutch 22 and a clutch shaft 25, so that when a working oil pressure is applied to the front clutch 20, it engages the shafts 14 and 25 with each other.

The rear clutch 30 comprises a clutch shaft 35 which is integrally coupled with the clutch drum 21, a clutch drum 31 and a multiple-plate clutch 32, so that this rear clutch engages the drum 21 and the drum 31 when a working oil pressure is applied to the clutch.

Figure 2:
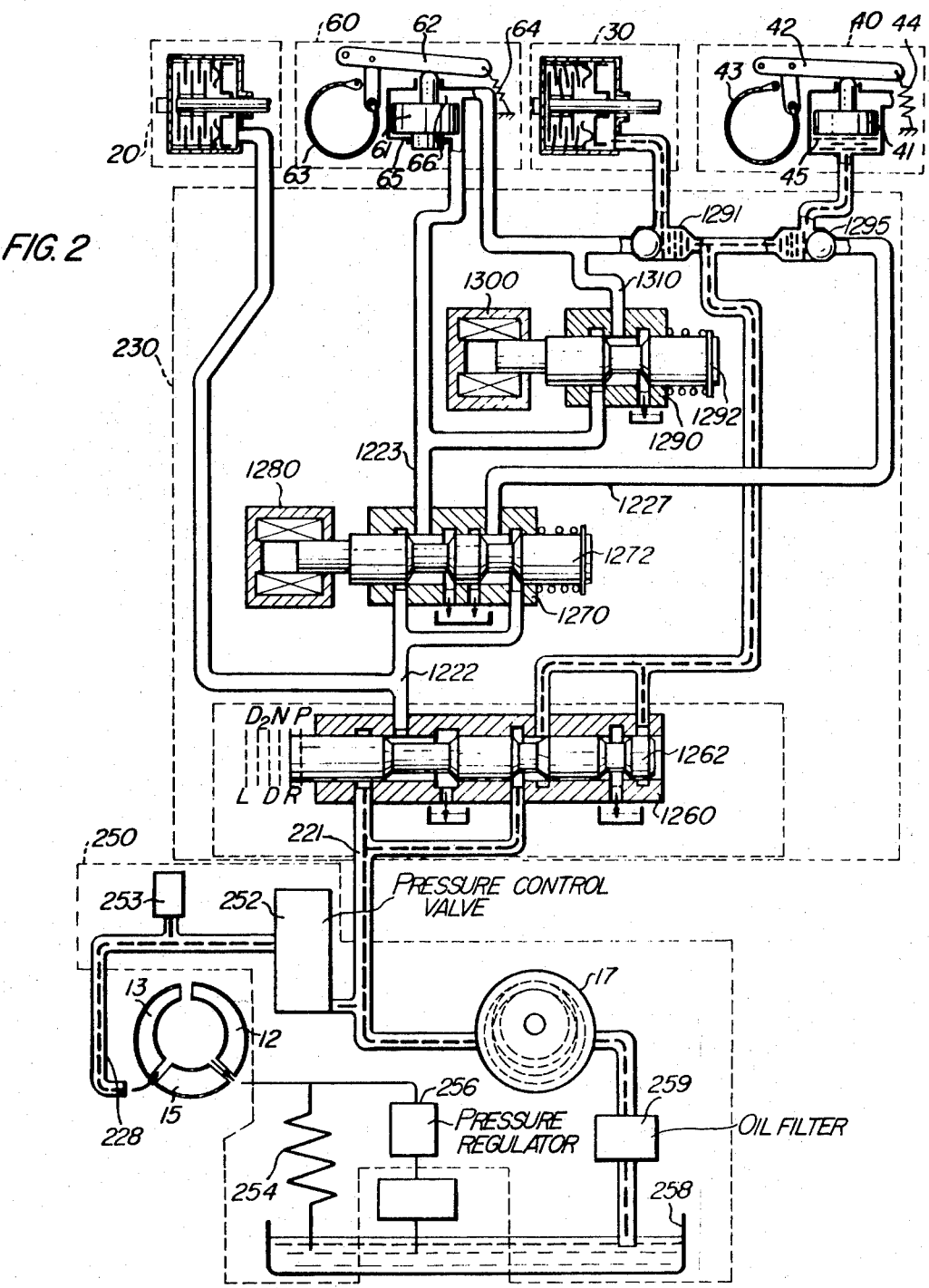
FIG. 2 is a system diagram explaining the operation of a hydraulic actuation circuit used when the present invention is incorporated in a three forward speed automatic transmission.

The rear brake 40 comprises, as shown in FIG. 2, a brake piston 41, a brake link 42, a brake band 43, a return spring 44, and a brake cylinder 45. When a working oil pressure is applied to the rear brake 40, the brake band 43 is applied to tighten a carrier 58 of the gear train 50 on a housing 18 against rotation.

The gear train 50 comprises, for example, a primary sun gear 51, a secondary sun gear 57, a third sum gear 55, a primary planetary gear 52, a secondary planetary gear 54, an output shaft 56 and a carrier 58. The gear train 50 consists of a planetary bevel-gear system wherein the primary sun gear 51 and the secondary sun gear 57 mesh with the primary planetary gear 52 oppositely, and the secondary planet gear 54 is integrally formed with the primary planet gear 52 and it is adapted to mesh with the third sun gear 55. The front brake 60 is composed of a brake piston 61, a brake link 62, a brake band 63, a return spring 64, and a brake cylinder 65, so that the application of a working oil pressure to the front brake 60 actuates the brake band 63 to hold the second sun gear 57 of the gear train 50 stationary in position. These clutches, brakes and the gear train are the same with those which are well-known in the art.

REVOLUTION DETECTING MEANS

A torque converter pump shaft revolution detecting means 70 comprises a revolution detector 71 (which will be discussed later in detail) mounted on the housing 18 and a toothed disk 72 mounted on the torque converter pump, so that if the toothed disk 72 has $n_1$ teeth, the detector 71 produces electrical signals $S_1$ which are $n_1$ times as many as the number of revolutions $N_1$ of the torque converter pump 12. Since the revolving shaft of the internal combustion engine and the shaft 11 are integrally coupled with each other, the detected electrical signals represent in fact the detection of the number of revolutions of the internal combustion engine ($S_1 = n_1 N_1$). A torque converter turbine shaft revolution detecting means 80 comprises a revolution detector 81 (which may be of the same structure as 71) mounted on the housing 18 and a toothed disk 82 (which may be of the same construction as 72). The toothed disk 82 is mounted on the front clutch drum 21 integrally with the torque converter turbine shaft 14, so that if the number of teeth in the disk 82 is $n_2$ (for example, $n_2 = 17$), the revolution detector 82 generates electrical signals $S_2$ which are $n_2$ times as many as the number of revolutions $N_2$ of the shaft 14 ($S_2 = n_2 N_2$). Instead of detecting by means of the detector 80, the detection of the revolutions of the torque converter turbine shaft 14 may be replaced by the computation of a value detected at a different place such as the one which is designated for an output shaft revolution detecting means 90 (as will be discussed later), and moreover the object of the present invention may be achieved as a matter of fact by detecting the revolutions at any place to which the revolutions of the torque converter turbine shaft 14 are imparted in direct drive.

The output shaft revolution detecting means 90 comprises a revolution detector 91 (which may be of the same structure as 71 and 81) mounted on the housing 18 and a toothed disk 92 integrally coupled with an output shaft 56, so that if the toothed disk 92 has $n_3$ teeth (for example, $n_3 = ,17$), the revolution detector 91 generates electrical signals $S_3$ which are $n_3$ times as many as the number of revolutions $N_3$ of the output shaft 56 ($S_3 = n_3 N_3$). Then, if the gear ratio is represented by K, the relationship as expressed by the following formulas hold between the signals $S_2$ and $S_3$:

$$S_2 = K \frac{n_2}{n_3} S_3 \text{ or } \left( S_3 = \frac{n_3}{n_2 K} S_2 \right)$$

where $K = N_2/N_3$ (gear ratio). In other words, it can be understood that the revolutions $N_2$ of the torque converter turbine shaft can also be derived from the output shaft revolutions $N_3$ according to these formulas.

The detection of the output shaft revolutions $N_3$ means the detection of the driving conditions of a vehicle, i.e., the car speed, while on the other hand the detection of the torque converter pump shaft revolutions $N_1$ corresponds to the detection of the revolutions of the internal combustion engine. Likewise, the detection of the torque converter turbine shaft revolutions is equivalent to the detection of the speed ratio between the torque converter pump shaft 11 and the torque converter turbine shaft 14, and this in turn means the detection of the slip ratio in the torque converter which gives an indication of the torque being transmitted by the torque converter at that instant.

Referring now to FIG. 4, the structure of the output shaft revolution detecting means 90 will be explained hereunder by way of an example. The toothed disk 92 concentrically secured on the output shaft 56 is composed of a disk-shaped magnetic material having formed on the periphery thereof 32 teeth spaced apart at equal intervals, and the revolution detector 91 is mounted on the housing 18 adjacent to the diametrical outer periphery of the disk 92. The revolution detector 91 is composed of a permanent magnet 101 and a coil 102 is wound on the magnet 101, which are housed within a suitable case of non-magnetic material, and the detector 91 is mounted on the transmission housing by this case such that the end of the permanent magnet 101 is located close to the outer periphery of the toothed disk 92. As the toothed disk 92 rotates so that the teeth on the toothed disk pass through the magnetic field produced by the permanent magnet 101, the leakage flux in the permanent magnet 101 changes thereby causing an electromotive force in the coil 102. In the case of the illustrated embodiment, 17 voltage signals will be generated for a rotation of the toothed disk 92. Generally, as previously explained, where $N_3$ represents the number of revolutions made within a unit time by a toothed disk having $n_3$ teeth, the voltage signal will be provided in the form of an AC voltage $S_3$ having a frequency $N_3 \times N_2$. In the figure, numeral 103 designates the output terminals of the detector.

The toothed disks 72 and 82 in the torque converter pump shaft revolution detecting means 70 and the torque converter turbine shaft revolution detecting means 80, respectively, have the same external shape as the aforesaid toothed disk 91 and they differ from the latter only with respect to the manner in which they are fixed to the torque converter and the clutch housing, respectively. The output signal voltages $S_1$, $S_2$ and $S_3$ from the three revolution detectors 70, 80 and 90 are delivered on connecting lines 311, 321 and 331 shown in FIG. 11.

Another essential aim of the present invention resides in the detection of the previously mentioned various revolutions in the form of electrical signals, and also in the computation of these revolutions and the speed ratios from the detected electrical signals to issue shift instructions to the hydraulic actuation circuit 230 of FIG. 2 through the logic circuit in accordance with the predetermined shift patterns, whereby the hydraulic actuation circuit is brought into action to effect gear changes in the gear train 50. Then, the gear engagements for effecting the three forward speeds will be attained by actuating the combinations of the front clutch 20, rear clutch 30, rear brake 40 and front brake 60 of FIG. 1 in the manner as summarized in the following table:

of which communicates with the first shift valve 1270. An oil passage 1223 extending from the first shift valve 1270 is forked into two branches such that one of the two branches directly communicates with a brake cylinder 65 of the front brake 60 and the other branch leads to the second shift valve 1290. An oil passage 1310 leads to the rear clutch 30 and a cylinder 66 of the front brake 60, respectively. The shift valves 1270 and 1290 are provided with the solenoids 1280 and 1300 mounted on respective valve spools 1272 and 1292, so that the gear engagements required for the forward first, second and third speeds are provided by the various combinations of the operating conditions of the two solenoids as shown in the following table:

|  | Solenoid 1280 | Solenoid 1300 |
|---|---|---|
| First speed |  |  |
| Second speed | Energized |  |
| Third speed | Energized | Energized |

|  |  | Front clutch (20) | Rear clutch (30) | Front brake (60) | Rear brake (40) |
|---|---|---|---|---|---|
| Reverse 'R' |  |  | Engaged |  | Applied |
| Forward | 1st Speed 'L' | Engaged |  |  | Applied |
|  | 2nd Speed 'DL' | Engaged |  | Applied |  |
|  | 3rd Speed 'DH' | Engaged | Engaged |  |  |

HYDRAULIC ACTUATION CIRCUIT

In FIG. 2, there is shown the structure of the hydraulic actuation circuit incorporated in a three forward speed automatic transmission system embodying the present invention, which is broadly divided into an oil pressure source 250 and a hydraulic circuit 230. The hydraulic circuit 230 comprises a manual valve 1260, first and second shift valves 1270 and 1290, solenoids 1280 and 1300, check valves 1291 and 1295 and the associated oil passages. The oil pressure source 250 comprises an oil pressure pump 17, an oil filter 259, an oil pan 258, a pressure regulator valve 256, a pressure control valve 252, a relief valve 253 and an oil cooler 254. The oil pressure source 250 functions to supply working oil for the torque converter, lubricating oil for the transmission gears and oil under pressure for the hydraulic actuation circuit. (These functions are well known in the art and therefore will not be explained here.) The manual valve 1260 is composed of a valve spool 1262 and a valve casing 1261. The valve spool 1262 is linked to a control lever (not shown) installed in the driver's compartment such that this valve is actuated in associated relation as the control lever is moved to its positions P, R, N, D, $D_2$ and L (which are the conventionally used gear selected positions and the corresponding letters, namely, P designating, parking; R, reverse; N, neutral; D, drive; $D_2$, second gear and L, low gear). Those positions P, R, N, D, $D_2$ and L shown in FIG. 2 designate the corresponding positions into which the valve spool 1262 is moved upon movement of the control lever. An oil passage 221 leading to the manual valve 1260 communicates with the latter in two-forked branches, while an oil passage 1222 from the manual valve 1260 is forked into two branches one As the solenoid 1280 is energized, the first shift valve 1270 has its valve spool 1272 moved into a leftward position in the illustration communicating the oil passages 1222 and 1223 with each other, while on the other hand the valve spool 1272 is moved into its rightward position shown in he illustration upon de-energization of the solenoid to thereby disconnect the oil passages 1222 and 1223 and communicates the oil passages 1222 and 1227 with each other.

With the second shift valve 1290 in position as shown in the illustration, the oil passages 1223 and 1310 are not communicating with each other. Upon energization of the solenoid 1300, however, the valve spool 1292 is moved to the left so that the oil passage 1292 is now connected with the oil passage 1310.

The shift regions and the structure of the control unit in the three forward speed automatic transmission system of the present invention are as follows:

SHIFT REGIONS FOR THREE FORWARD SPEED AUTOMATIC TRANSMISSion SYSTEM

The shift regions for the three forward speeds in the automatic transmission system of the present invention involve: (1) the internal combustion engine speed (rpm) limits; (2) the car speed limits; and (3) the slip ratio ranges. While the actual values of these limits may not be the same for different situations, some results of the tests conducted by the inventors are given by way of an example in FIGS. 3a and 3b.

1. Internal combustion engine speed limits:
   In order that the gear ratio is changed from the low gear (1st speed) to the second gear (2nd speed), the lower limit is not specifically set for the engine rpm (torque converter pump shaft rpm), although it will be of the order of $N_1 = 1,100$ rpm in consideration of the slip ratios and the car speeds. When the shift is made from the second gear (2nd speed) to the low gear (1st speed), the lower limit is set to the torque converter pump shaft revolutions $N_1 = 600$ rpm, which corresponds to the speed limits at which the engine remains stable. On the other hand, while no limit is specifically set to the revolutions of the torque converter pump shaft with respect to the gear changes from the second gear (2nd speed) to the top gear (3rd speed) and from the top to the second gear (FIG. 3b), the corresponding speeds will be of the order of $N_1 = 1,600$ rpm and $N_1 = 900$ rpm, respectively, in consideration of the slip ratios and the car speeds.

2. Car speed limits:

In an automobile, when the shift is made fro the low to the second gear, the lower limit is set to the torque converter turbine shaft revolutions $N_2 = 1,402$ rpm (15 km/h in car speed equivalent) in view of the fact that driving in second gear at a very low speed tends to restrict freedom of acceleration and deceleration. On the contrary, when the shift is made from the second to the low gear, the lower limit is set to the torque converter turbine shaft revolutions $N_2 = 552$ rpm (10 km/h in car speed equivalent) because the shift may be more advantageously effected at a lower car speed from the viewpoint of the noise or the like. On the other hand, when the shift is made from the second to the top gear, the lower limit is set to the torque converter turbine shaft revolutions $N_2 = 1,660$ rpm (30 km/h in car speed equivalent) so that the shift will not take place at a very low speed, while the lower limit is set to the torque converter turbine shaft revolutions $N_2 = 954$ rpm (25 km/h in car speed equivalent) for the shift from the top to the second gear in consideration of the noise and the like.

3. Slip ratio ranges:

During normal driving when the torque is transmitted by the torque converter from the internal combustion engine to the output shaft 56, it is preferable to make a gear change within the region where the slip ratio is between 0.5 and 1.0, so that a better performance of the torque converter is ensured. Consequently, the slip ratio was set to 0.85 for the shift from the low to the second gear and to 0.75 for the shift from the second to the low gear. On the other hand, the slip ratio was set to 0.9 for the shift from the second to the top gear and to 0.65 when the shift was made from the top to the second gear.

When the torque is transmitted from the output shaft 56 to the internal combustion engine through the torque converter, the slip ratio should preferably be approximate 1.0, i.e., within the range from 0.9 to 1.3 depending on the engine braking or the like in order to ensure better performance of the torque converter. Thus, the slip ratio was set to 1.25 when the shift was made from the low to the second gear, while the slip ratio was set to 1.05 when the shift was made from the second to the top gear.

The structure and operation of the control unit will now be explained by way of example in conjunction with the gear changing operations in accordance with the shift points (lines) shown in FIGS. 3a and 3b.

CONTROL UNIT

Figure 11:
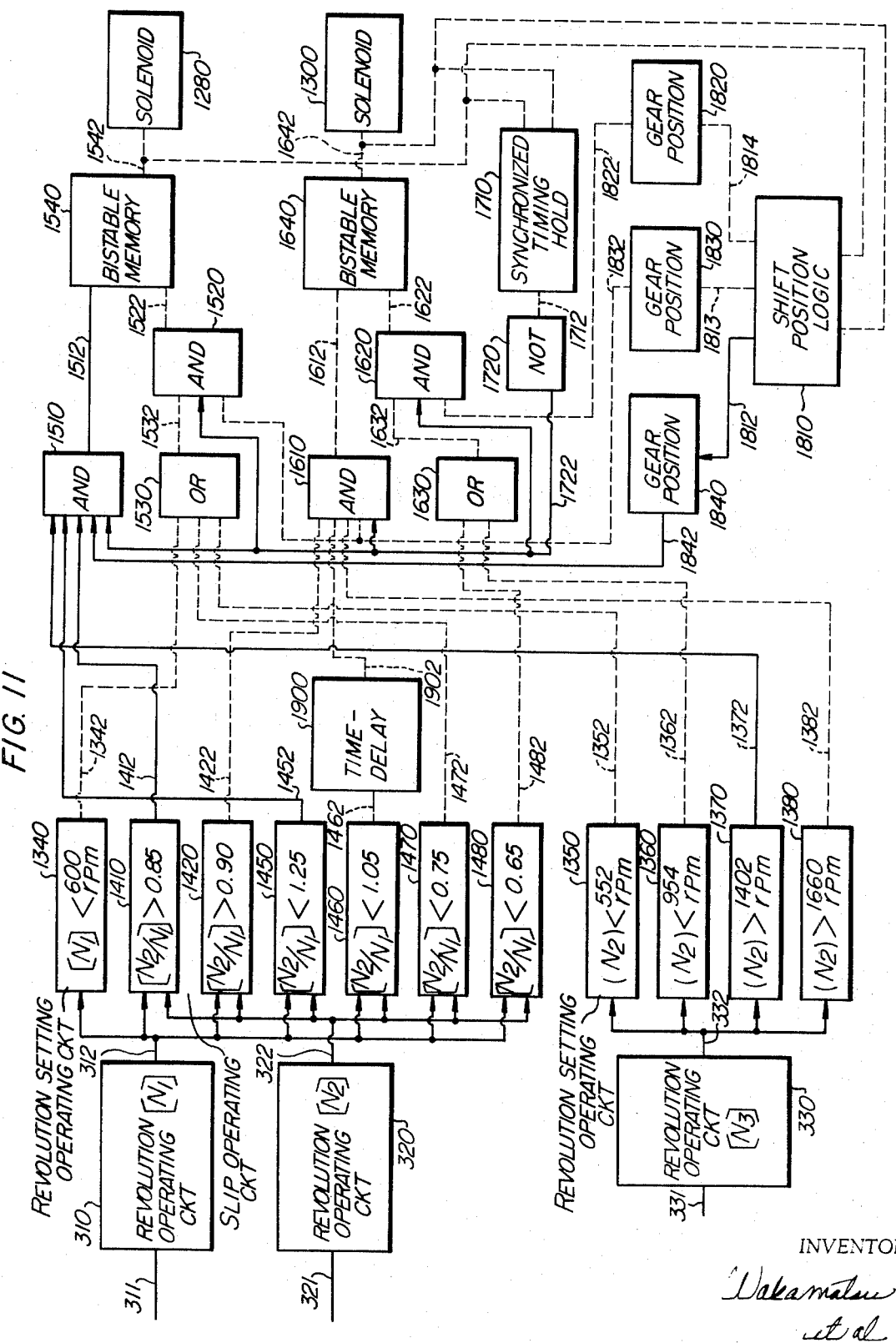
FIG. 11 is a block diagram which shows the structure of the control unit according to the embodiment of the present invention and explains the logical operations for effecting a shift from the low to the second gear.

The control unit for shift control purposes comprises, as shown in FIG. 11, revolution operating circuits 310, 320 and 330 for computing the revolutions of the torque converter pump shaft, torque converter turbine shaft and output shaft, respectively; six slip operating circuits 1410, 1420, 1450, 1460, 1470 and 1480; five revolution setting operating circuits 1340, 1350, 1360, 1370 and 1380; four AND circuits 1510, 1520, 1610 and 1620; two OR circuits 1530 and 1630; two bistable memory circuits 1540 and 1640; a synchronized timing hold circuit 1710; a NOT circuit 1720; three gear position circuits 1820, 1830 and 1840; a shift position logic circuit 1810 and a time-delay circuit 1900.

In the discussion to follow, the above-mentioned component elements will be explained. As the control lever for the hydraulic actuation circuit is shifted to the D position, a circuit is established between a power source and the control unit by a switch which is not shown, so that the control unit is now ready to exercise controls. The component elements as shown in FIG. 11 will be explained individually hereunder. The input to the torque converter pump shaft revolution operating circuit 310 is the output voltage $S_1$ from the torque converter pump shaft revolution detector 70 which is applied to the former through a line 311, and its output signal is an electrical signal $[N_1]$ representing, i.e., proportional to, the revolutions of the torque converter pump shaft and it is delivered through a line 312. In the discussion to follow, brackets [ ] will be added to those electrical signals which represent the revolutions. The input to the torque converter turbine shaft revolution operating circuit 320 is the output voltage $S_2$ from the torque converter turbine shaft revolution detector 80 which is applied to the former through a line 321, and its output signal is an electrical signal $[N_2]$ representing the revolutions of the torque converter turbine shaft and it is delivered through a line 322.

The output shaft revolution operating circuit 330 receives its input through a line 331, which is the output voltage $S_3$ from the output shaft revolution detector 90, and its output is an electric signal $[N_3]$ representing the revolutions of the output shaft and it is delivered through a line 332. The input to the revolution ($[N_1] <$ 600 rpm) setting operating circuit 1340 is the $[N_1]$ which is applied thereto through the line 312, and its output signal is an electrical signal which represents ($[N_1] <$ 600 rpm) and it is delivered through a line 1342.

Similarly, the revolution (($N_2$) < 552 rpm) setting operating circuit 1350, the revolution (($N_2$) < 954 rpm) setting operating circuit 1360, the revolution ((*54 $N_2$*) > 1,402 rpm) setting operating circuit 1370 and the revolution (($N_2$)>1,660 rpm) setting operating circuit 1380 all receive the same input $[N_3]$ which is applied thereto through a line 332, and these circuits have output electrical signals representing $((N_2) < 552$ rmp), $((N_2) < 954$ rmp), $((N_2) > 1,402$ rpm) rpm) and $((N_2) > 1,660$ rpm), respectively, which are delivered through lines 1352, 1362, 1372 and 1382, respectively. Here, the symbol $(N_2)$ indicates a value obtained by expressing in terms of the torque converter turbine shaft revolutions.

The slip $([N_2/N_1] > 0.85)$ operating circuit 1410 receives at its imputs the two electrical signals $[N_1]$ and $[N_2]$ which are applied thereto through the lines 312 and 322, and it has an output signal (voltage) representative of the result of an operation of $([N_2/N_1] > 0.85)$, which is delivered through a line 1412. Similarly, the inputs to the slip operating circuits 1420, 1450, 1460 and 1470 consist of the two signal voltages $[N_1]$ and $[N_2]$ which are applied thereto through the lines 312 and 322. The outputs of these circuits are signals (voltage) representative of the results of the operations of $> 0.90$, $[N_2/N_1] < 1.25$, $[N_2/N_1] < 1.05$, $[N_2/N_1] <$ and $([N_2/N_1] < 0.75)$ and these signals are delivered through their respective lines 1422, 1452, 1462 and 1472.

ESSENTIAL CIRCUITS IN THE CONTROL UNIT OPERATING CIRCUITS

1. Revolution operating circuits:

The torque converter pump shaft revolution operating circuit 310, the torque converter turbine shaft revolution operating circuit 320 and the output shaft revolution operating circuit 330 are operating circuits adapted to receive the above described signal voltages $S_1$, $S_2$ and $S_3$ as their respective inputs to compute the associated revolutions and these three circuits are of similar structures. The structures of these revolution operating circuits will be understood by referring to FIG. 5 which illustrates by way of example the circuit structure of the torque converter pump shaft revolution operating circuit 310. The input signal (voltage) $S_1$ supplied to the circuit through the line 311 is amplified in an amplifier circuit 313, and applied to an amplitude limiter circuit 314 where the signal is limited in amplitude to a predetermined level, and then converted into a DC voltage in a frequency-DC voltage converter circuit 315 (which is composed of a frequency detection and rectification circuit) to deliver the DC voltage through the line 312.

2. Slip operating circuit:

The output signal voltages $[N_1]$ and $[N_2]$ from the revolution operating circuits 310 and 320 are applied to the six types of the slip operating circuits 1410, 1420, 1450, 1460, 1470 and 1480 via the lines 312 and 322, respectively. These operating circuits are of the same structure. The structure of the slip operating circuits of this type is shown by way of example in FIG. 6 which illustrates the slip $([N_2/N_1] > 0.85)$ operating circuit 1410 of an electric type. The lines 312 and 322 are respectively connected to potentiometers 414 and 415 at one ends thereof. The other ends of the potentiometers 414 and 415 are grounded and their respective slider arms 416 and 417 are connected to a differential amplifier 418 whose output signal is developed on a line 1412.

In this case, the operation of the slip ratio is to compute $[N_2/N_1] > 0.85$ which is equivalent to compute $[N_2] > 0.85 [N_1]$, or $[N_2] - 0.85 [N_1]$.

The slider terminal 416 is positioned such that when the signal $[N_1]$ is applied to the potentiometer 414 (via the line 312), it has an output voltage of $0.85 [N_1]$ at the slider terminal 416. On the other hand, the slider terminal 417 is so positioned, that is, the terminal 417 is placed in position where it is directly coupled with the line 322 such that the application of the signal $[N_2]$ to the potentiometer 415 causes it to develop at the slider terminal 417 a voltage corresponding to $[N_2]$. These two voltages are applied to the differential amplifier 418 so that the difference between the two voltages, that is, the computation of $[N_2] - 0.85 [N_1]$, is performed, whereupon if the result is positive, it is amplified to provide a predetermined voltage on the line 412. If the result is negative, no voltage appears at the output in spite of the amplification. In other words, the presence of the voltage indicates the case that $[N_2] - 0.85 [N_1] > 0$, which means the result of the computation indicates $[N_2/N_1] > 0.85$. When $[N_2/N_1] < 0.85$, no voltage appears at the output. Thus, for example, if it is necessary to obtain a signal representing $[N_2/N_1] < 0.85$, this may be achieved in an alternative manner in which the signal $[N_2]$ is supplied over the line 322 which, in this case, is directly coupled to the slider terminal 417 and at the same time the signal $[N_1]$ is supplied over the line 312 and the slider terminal 416 is placed in position such that a signal voltage corresponding to $0.85 [N_1]$ is taken at the slider terminal 416.

By suitably adjusting the settings of the potentiometers and suitably selecting the input terminals in the manner described above, the computations of $[N_2/N_1] > 0.90$, $[N_2/N_1] < 1.25$, $[N_2/N_1] < 1.05$, $[N_2/N_1] < 0.75$ and $[N_2/N_1] < 0.65$ can be performed. The output signals from the operating circuits appear as a voltage on each of lines 1412, 1422, 1452, 1462, 1472 and 1482.

2. Revolution setting operating circuits:

There are five revolution setting operating circuits 1340, 1350, 1360, 1370 and 1380. These circuits are operational circuits which determine whether an output signal should be produced depending on whether the input voltages $[N_1]$ and $[N_3]$ are higher or lower than the preset values, and these five circuits are of the same circuit structure. In FIG. 7 there is shown the construction of the operating circuit 1340 for $[N_1] < 600$ (rpm) by way of an example of the construction of the revolution setting operating circuits.

The input to a potentiometer 343 is applied through the line 312 in the form of a voltage representing the revolution $[N_1]$ and a slider terminal 344 of this potentiometer is coupled to a reference voltage 345 (for example, a zener diode which conducts at a voltage level higher than the reference voltage) whose output is connected to an amplifier circuit 346, which in turn produces an output on a line 1342. The slider terminal 344 is placed in the position such that the voltage $[N_1]$ applied to the potentiometer 343 is divided to a suitable value by the slider terminal 344. As the voltage across the slider terminal 344 becomes higher than the reference voltage 345, the latter applies a signal to the amplifier circuit 346 so that the amplifier circuit 346 provides the amplified voltage. On the contrary, no voltage is provided when the reference voltage 345 is higher than the voltage across the slider terminal 344. For example, in the case of a circuit structure in which an output signal (voltage) appears on the line 1342 at 500 rpm when the slider terminal 344 of the potentiometer 343 is placed in position such that it is directly coupled with the line 312, the setting of $[N_1] < 600$ rpm can be achieved by placing the slider terminal 344 at a position apart from the grounded end by 1,200/2,000, so that an output signal voltage is taken over the line 1342 only when $[N_1]$ is less than 600 rpm.

3. Synchronized timing hold circuit:

The hydraulic actuation circuit and the transmission will be engaging in a gear changing operation during a little while just following the moment at which the solenoids 1280 and 1300 are separately or simultaneously energized or de-energized, so that should the application of another different shift signal take place, the gear changing operation can not be carried out to the fullest extent. Thus, there is a need to maintain the existing situation so that the application of another shift signal will not cause another gear changing operation until the current operation has been completely carried out.

Figure 9A:
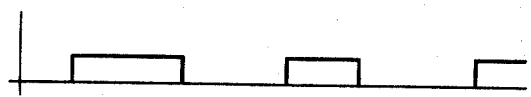
FIGS. 9a to 9b are diagrams showing the operating voltage waveforms of the synchronized timing hold circuit.
Figure 9B:
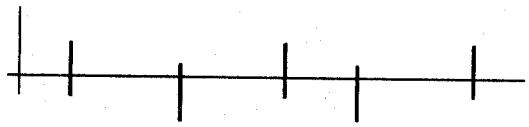
Figure 9C:
Figure 9D:
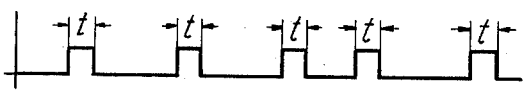

In order to provide such a signal, the synchronized timing hold circuit 1710 is incorporated which comprises, a shown by way of example in FIG. 8, differentiator circuits 563A and 563B, a rectifier circuit 564 and a monostable multivibrator 565. In operation, as shown in FIG. 9a, for example, when the voltage applied to the solenoid 1280 is supplied to the differentiator circuit 563A through a line 1542, the voltage is differentiated in this circuit as shown in FIG. 9b so that a signal is provided each time the solenoid is energized or de-energized. This signal is then rectified in the rectifier circuit 564 as shown in FIG. 9c. The rectified signal is in turn used to trigger the monostable multivibrator 565 so that output signals having a time duration t are delivered on a line 1712 as shown in FIG. 9d. This signal (voltage) of time duration t is applied to a NOT circuit 1720 (which is composed of a phase inverter circuit) wherein the signal is inverted so that no signal is present for t seconds. The inverted signal is then delivered on a line 1722.

In order to hold the synchronized timing, an alternative is possible wherein the completion of a gear change in the transmission following the energization or de-energization of the solenoids is detected at any suitable portion of the transmission in the form of an electric signal, and this alternative is not contradictory to the objects of the present invention.

4. Logic circuitry:

AND circuits 1510, 1520, 1610 and 1620 are those circuits which are generally known as AND gates or coincidence gates for producing a logical product, and the operation of these circuits will be explained later.

Figure 10:
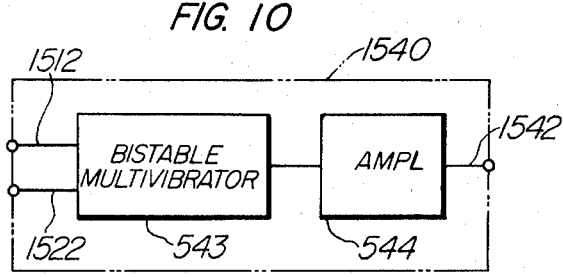
FIG. 10 is a block diagram showing the structure of a bistable memory circuit.

5. Bistable memory circuit:

The structure of a bistable memory circuit 1540 which is one of the bistable memory circuits 1540 and 1640 is shown by way of example in FIG. 10, in which lines 1512 and 1522 are connected to the input terminals of a bistable multivibrator 543 so that when a signal voltage appears on the line 1512, the bistable multivibrator 543 is immediately caused to pass into one of the two stable states and the output from the multivibrator 543 is amplified in an amplifier circuit 544 whose output voltage is delivered over a line 1542 to be applied to the solenoid 1280.

Then, as another input signal is applied to the line 1522, the bistable multivibrator 543 is changed into the other stable state so that although is output is amplified in the amplifier, there is no longer any output voltage from the amplifier. Accordingly, for example, if an input voltage is supplied to the line 1512 and this input signal (voltage) eventually disappears, the state caused by the input signal is held thus maintaining the energization of the solenoid 1280. Furthermore, the continued energization of the solenoid 1280 is maintained even though another signal (voltage) were applied to the line 1512.

Figure 24:
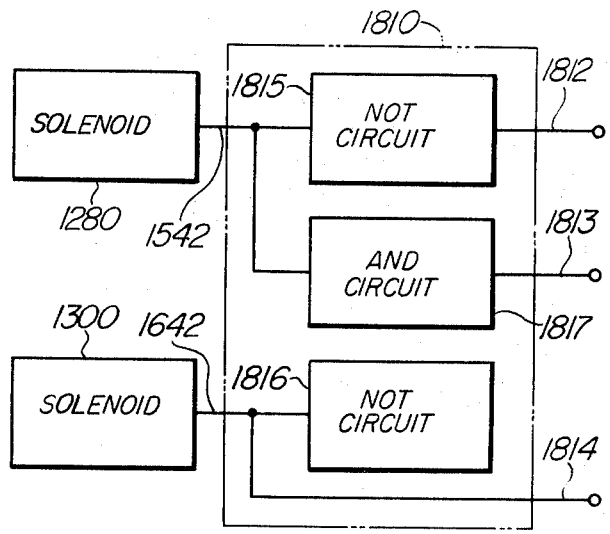
FIG. 24 is a block diagram showing the structure of a gear shift position logic circuit in the control unit.

6. Shift position logic circuit:

For example, the shift position logic circuit 1810 comprises, as shown in FIG. 24, NOT circuits 1815 and 1816, and an AND circuit 1817. When the solenoids 1280 and 1300 are de-energized, an output signal appears on a line 1812 (In FIG. 24, a signal appears on the line 1812 when the solenoid 1280 is de-energized) and a low gear position signal is supplied to a line 1842 from a low gear position circuit 1840. When the solenoid 1280 is energized and the solenoid 1300 is de-energized, an output signal appears on a line 1813, so that a second gear position signal is provided on a line 1832 from a second gear position circuit 1830, while an output signal is developed on a line 1814 when both of the solenoids 1280 and 1300 are energized (in FIG. 24, a signal appears on the line 1814 when the solenoid 1300 is energized) so that a top gear position signal is provided on a line 1822 from a top gear position circuit 1820. These combinations are given in the following table:

| | Solenoid 1280 | Solenoid 1300 |
|---|---|---|
| Low gear position signal | De-energized | De-energized |
| Second gear position signal ( signal | Energized | De-energized |
| Top gear position signal | Energized | Energized |

7. Time-delay circuit:

The input to the time-delay circuit 1900 is a $[N_2/N_1] < 1.05$ signal from the slip operating circuit 1460, which is supplied through the line 1462. This $[N_2/N_1] < 1.05$ signal is delivered through a line 1902 only when the signal remains on in excess of a preset time such as 0.5 seconds, whereas no $[N_2/N_1] < 1.05$ signal is delivered on the line 1902 when the signal is extinguished within the said preset time of 0.5 seconds. Such may be accomplished in any conventional fashion, for example by the Anding of the output signal from circuit 1460 with the output of a monostable multivibrator (not shown but like circuit 565 in FIG. 8) which also receives and effectively delays the circuit 1460 output signal for the desired preset time.

OPERATION OF CONTROL UNIT

Figure 12:
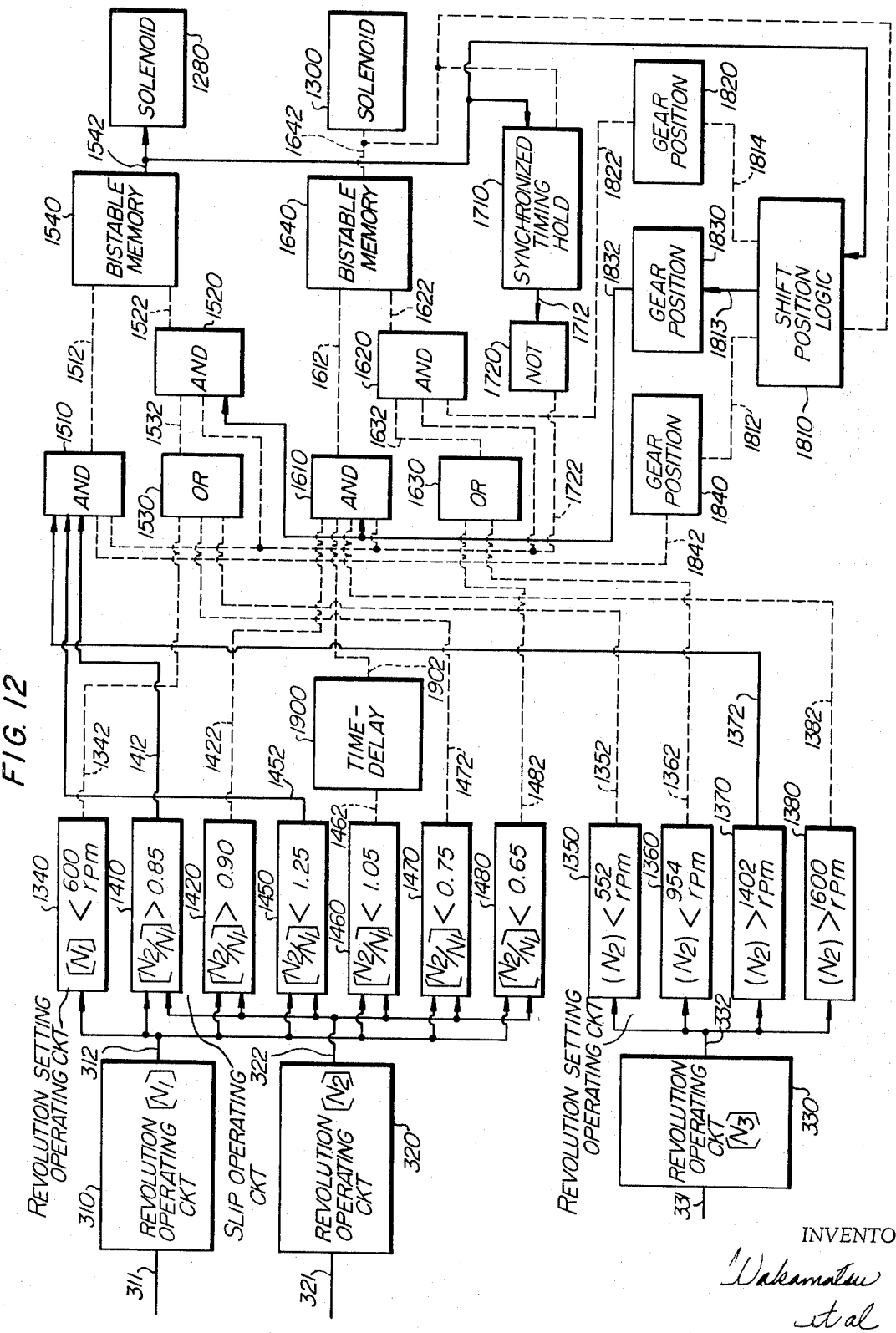
FIG. 12 is a block diagram explaining the logical operations of the synchronized timing hold circuit following the gear changing operation from the low to the second gear.

1. The logical operations for the shift from the low to the second gear will be explained. The shift from the low to the second gear occurs when the condition of the torque converter is moved to the inner side of the shift region defined by solid lines in FIG. 3a, so that a signal is applied, as shown in FIG. 11, to the bistable memory circuit 1540 from the AND circuit 1510 via the line 1512 and the solenoid 1280 is energized as shown in FIG. 12, whereupon the shift valve 1272 in FIG. 2 is moved to the leftwards and the front clutch 20 and the front brake 60 are actuated to thereby cause the gear train 50 to change from the low to the second gear.

Figure 13:
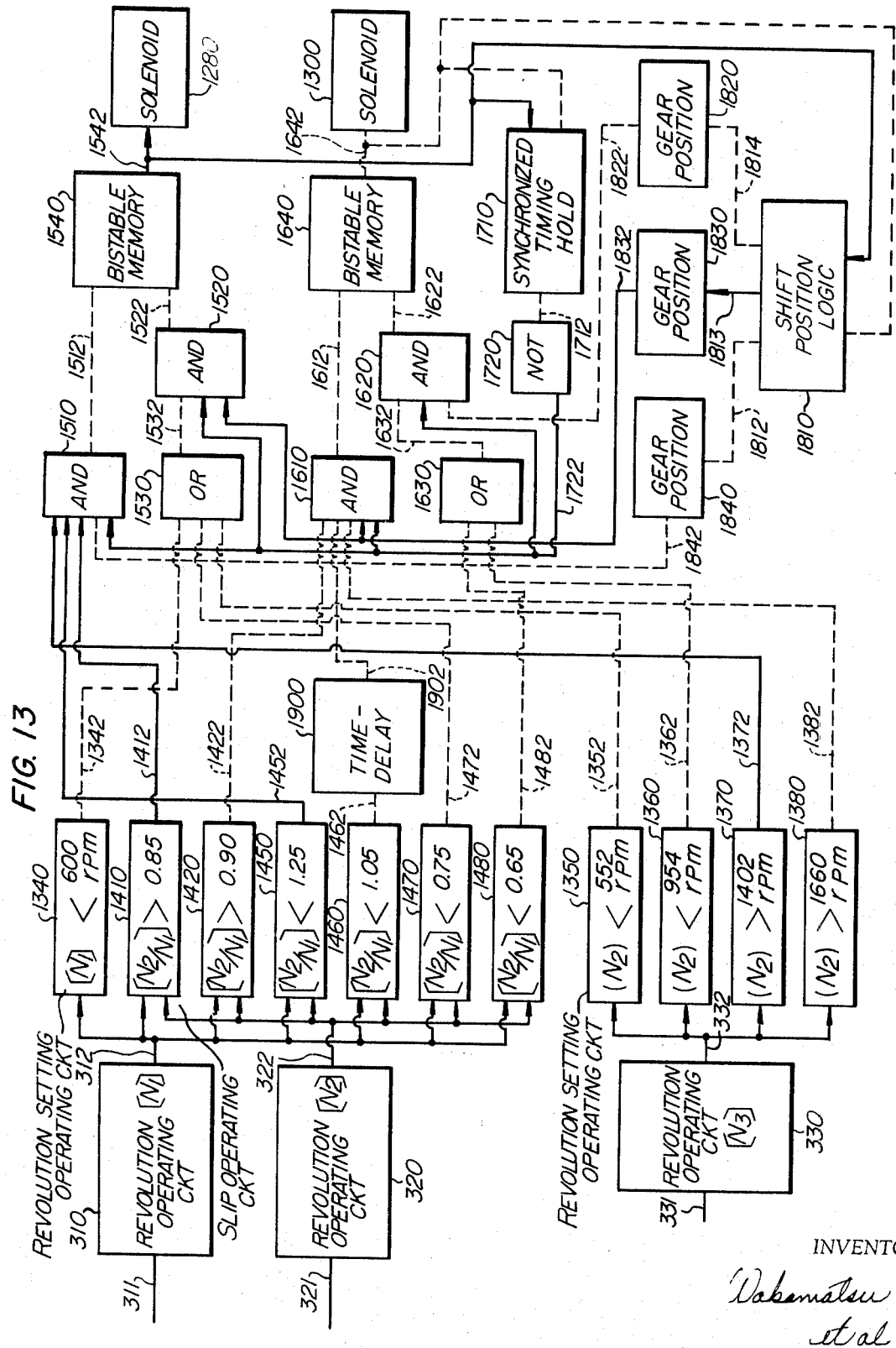
FIG. 13 is a block diagram explaining the logical operations performed when a synchronized timing holding signal is extinguished following the gear changing operation from the low to the second gear.

In FIGS. 11 through 23, those circuits which are supplied with signal voltages are shown by thick solid lines, while other circuits carrying no signal voltages are indicated by connecting with each other by broken lines. As shown in FIG. 12, immediately following the energization of the solenoid 1280 the signal from the line 1542 causes the shift position logic circuit 1810 and the second gear position circuit 1830 to provide a second gear position signal which is in turn applied to the AND circuits 1520 and 1610. On the other hand, a signal is supplied via the line 1542 to the synchronized timing hold circuit 1710, so that the signal is applied to the NOT circuit over the line 1712 for $t$ seconds and thus no signal from the NOT circuit 1720 appears on the line 1722. Whereupon, one of the signals applied to the AND circuit 1510 is cut off with the result that the signal from the AND circuit 1510 is also cut off and the bistable multivibrator 1540 no longer receives any signal, but the solenoid 1280 remains energized by virtue of the memory action of the circuit 1540. Furthermore, since no signal is supplied from the NOT circuit 1720 to any one of the remaining AND circuits 1520, 1610 and 1620, no other gear changing operation will be allowed to take place during the aforesaid $t$ seconds no matter what any other slip ratio signal has been provided. Then, as the signal from the synchronized timing hold circuit 1710 terminates after the lapse of said $t$ seconds, the signal is no longer applied to the NOT circuit 1720 via the line 1712 as shown in FIG. 13 and now the NOT circuit 1720 applies a signal to the AND circuits 1510, 1520, 1610 and 1620 via the line 1722.

Figure 3A:
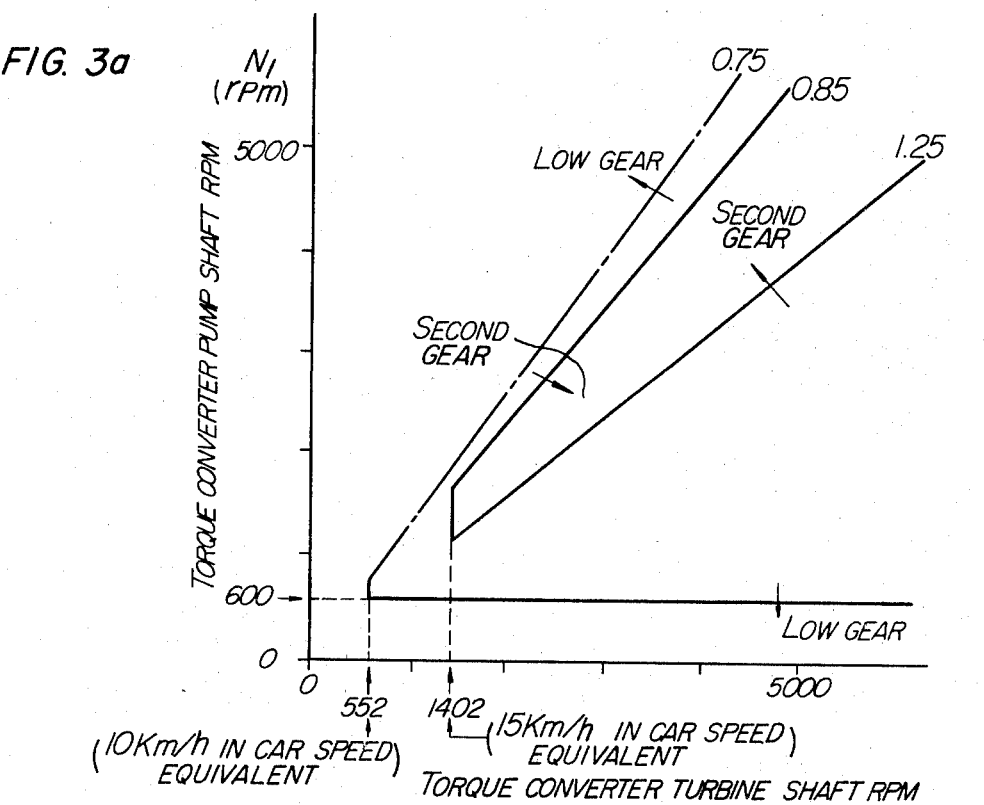
FIGS. 3a and 3b are graphs showing an example of the shift regions.
Figure 14:
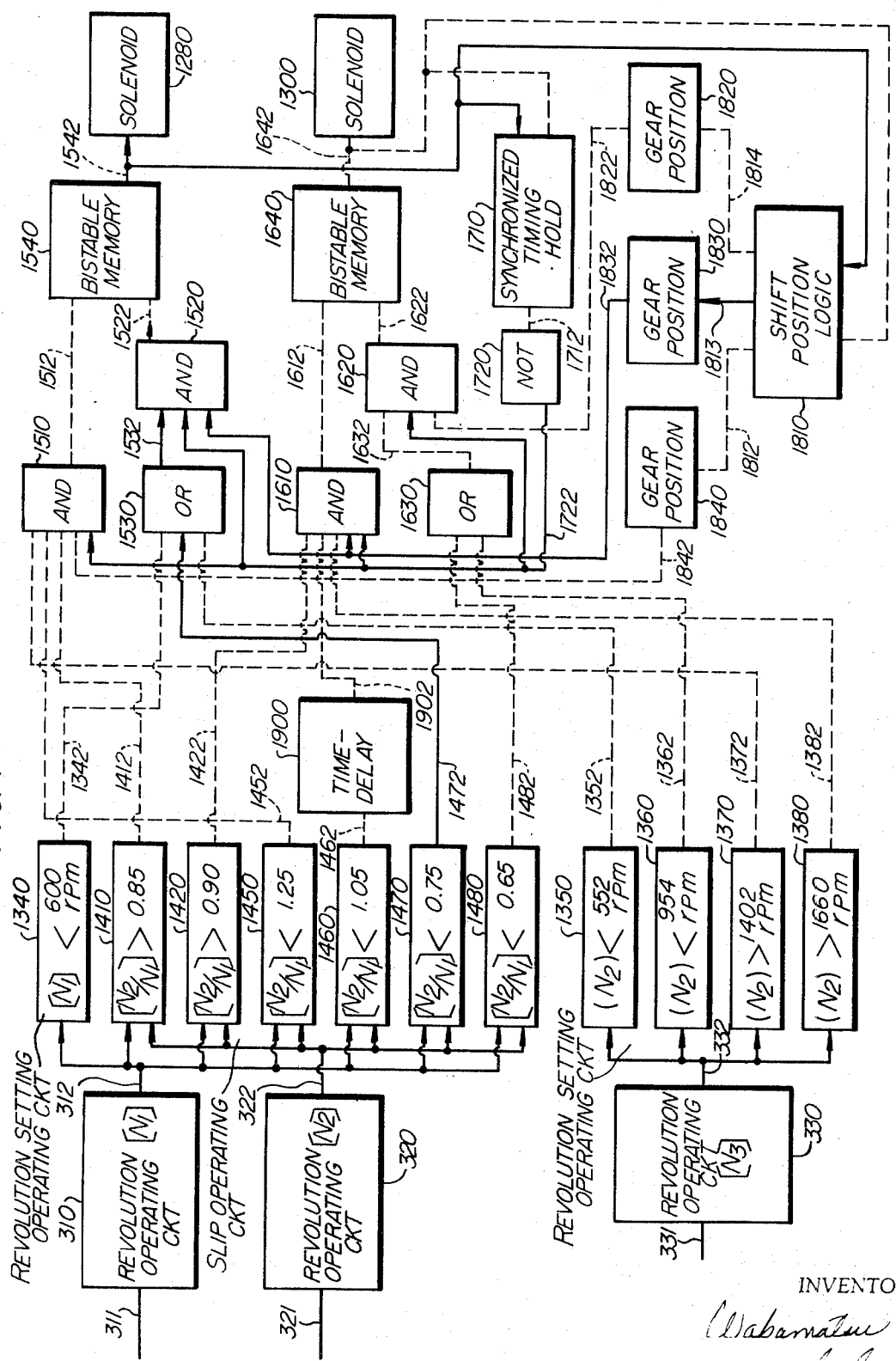
FIG. 14 is a block diagram explaining the logical operations which take place when the slip ratio becomes lower than 0.75 in the gear change from the second to the low gear.
Figure 15:
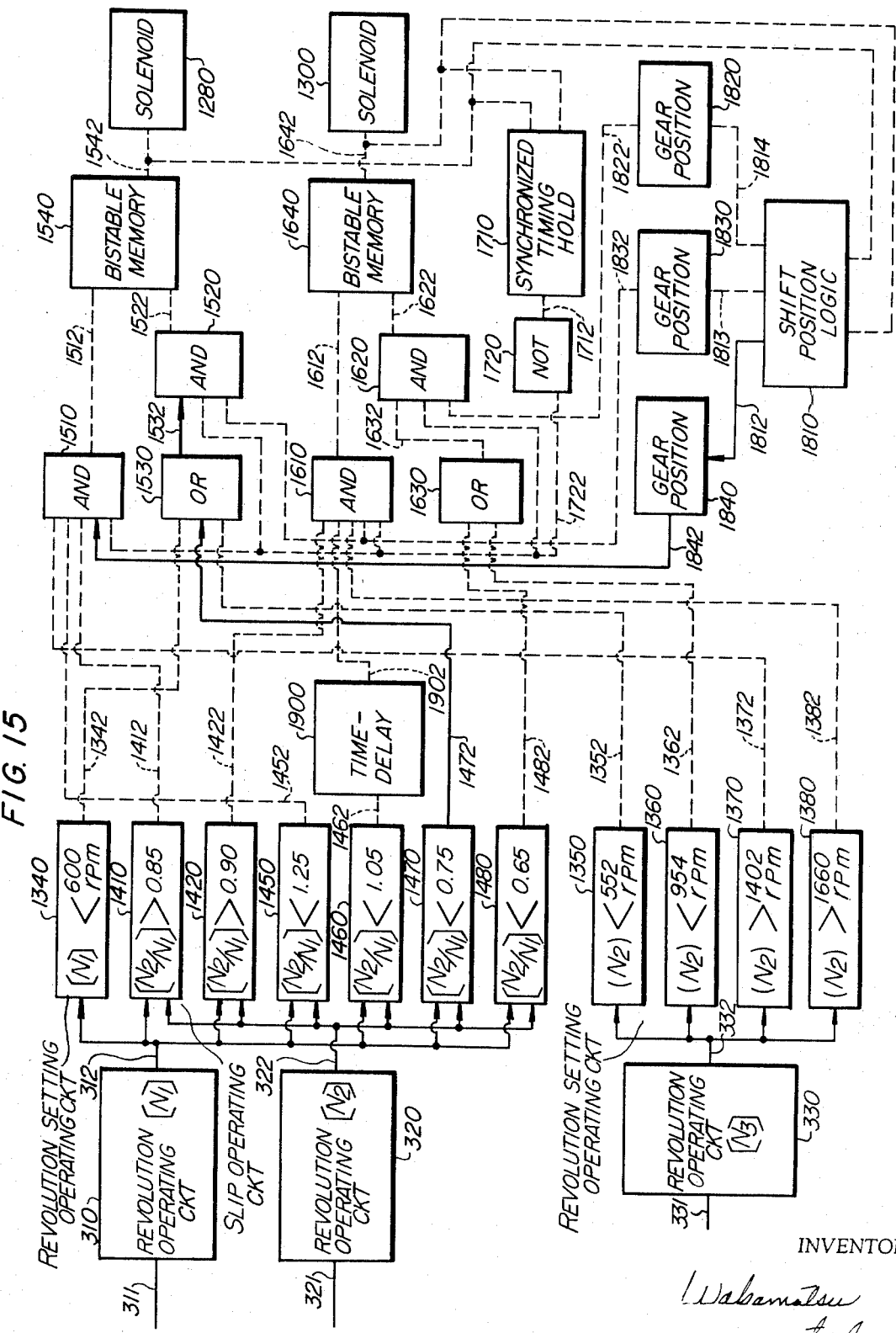
FIG. 15 is a block diagram explaining the logical operations which take place when the synchronized timing holding signal remains on following the gear changing operation from the second to the low gear.
Figure 16:
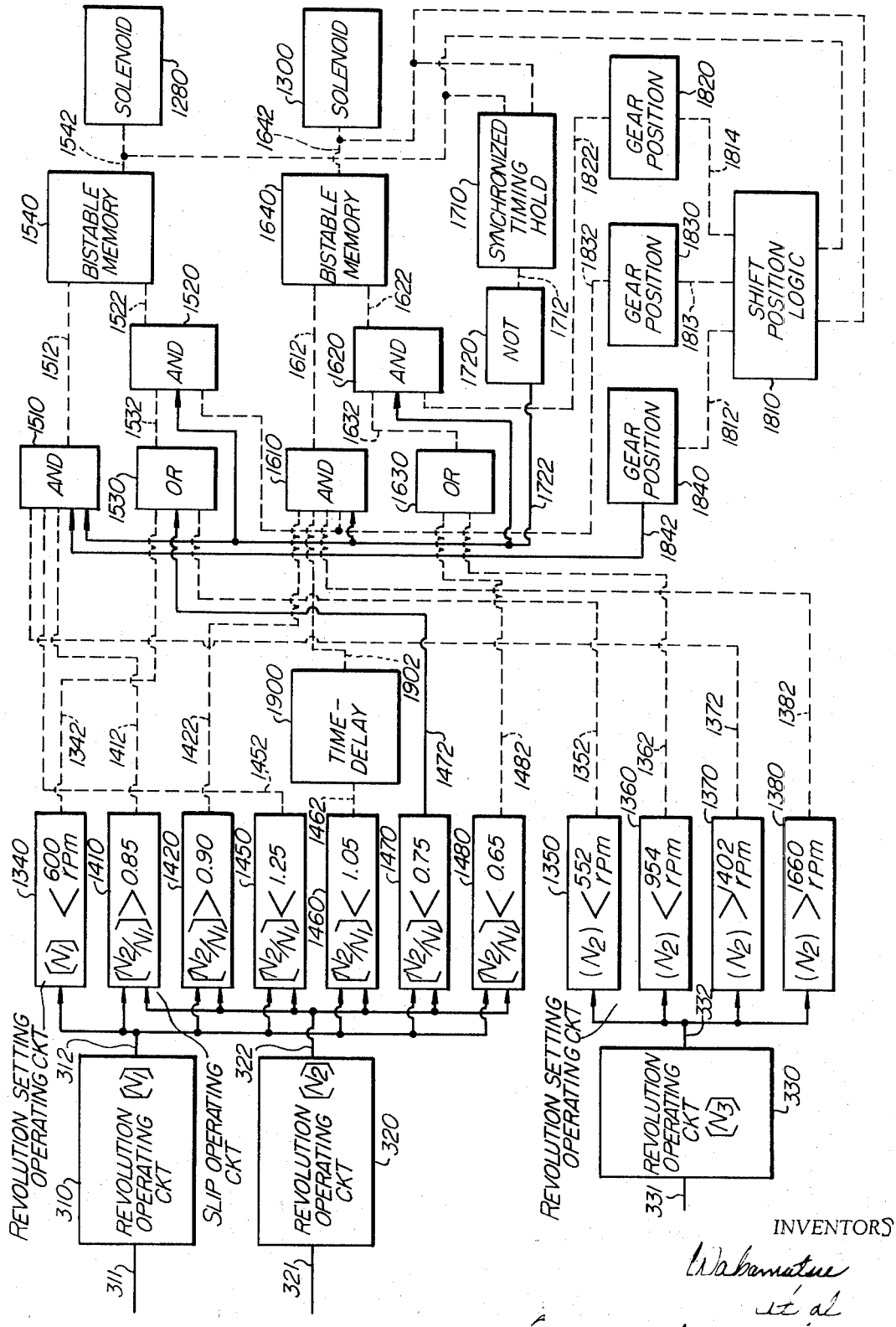
FIG. 16 is a block diagram explaining the logical operations which take place after the synchronized timing holding signal is turned off following the gear changing operation from the second to the low gear.

2. Logical operations for the shift from second to low gear:

In this case, when he condition of the torque converter is moved to the outside of the shift region defined by a one-dot chain line in FIG. 3a, i.e., the slip ratio $[N_2/N_1]$ becomes less than 0.75, a signal is developed on the line 1532 from the OR circuit 1530 as shown in FIG. 14, so that the AND circuit 1520 receives the required input signals to provide a signal on the line 1522 extending therefrom, whereupon the output signal from the bistable memory circuit 1540 terminates and the solenoid 1280 is de-energized thus changing the gear ratio to low gear. Immediately thereafter, owing to the generation of a signal from the synchronized timing hold circuit 1710 and in the absence of a signal from the NOT circuit 1720 as shown in FIG. 15, no further gear changing operation can take place during the period of $t$ seconds. Furthermore, as the signal on the line 1542 from the bistable memory circuit 1540 terminates, the shift position logic circuit 1810 and the low gear position circuit now come into operation to apply a low gear position signal to the AND circuit 1510 via the line 1842. Following the period of $t$ seconds, the NOT circuit 1720 provides a signal and the AND circuits 1510, 1520, 1610 and 1620 now receive the signal as shown in FIG. 16.

Figure 3B:
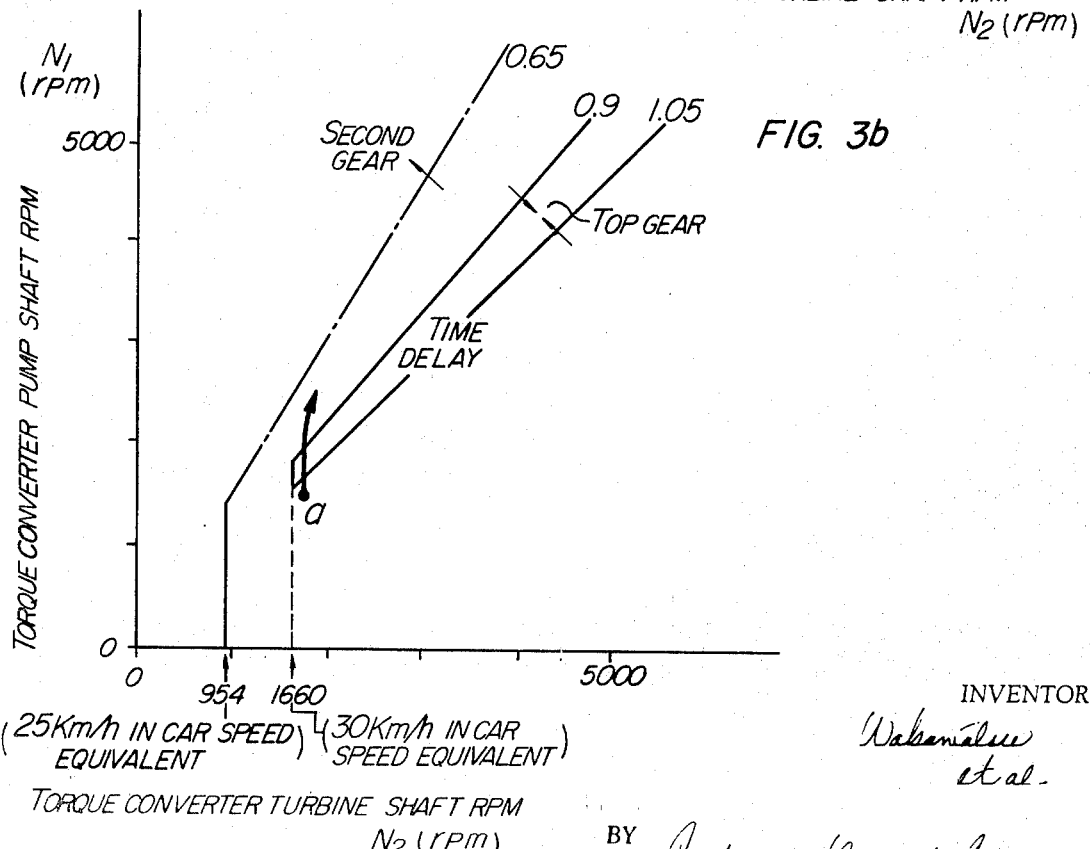
Figure 17:
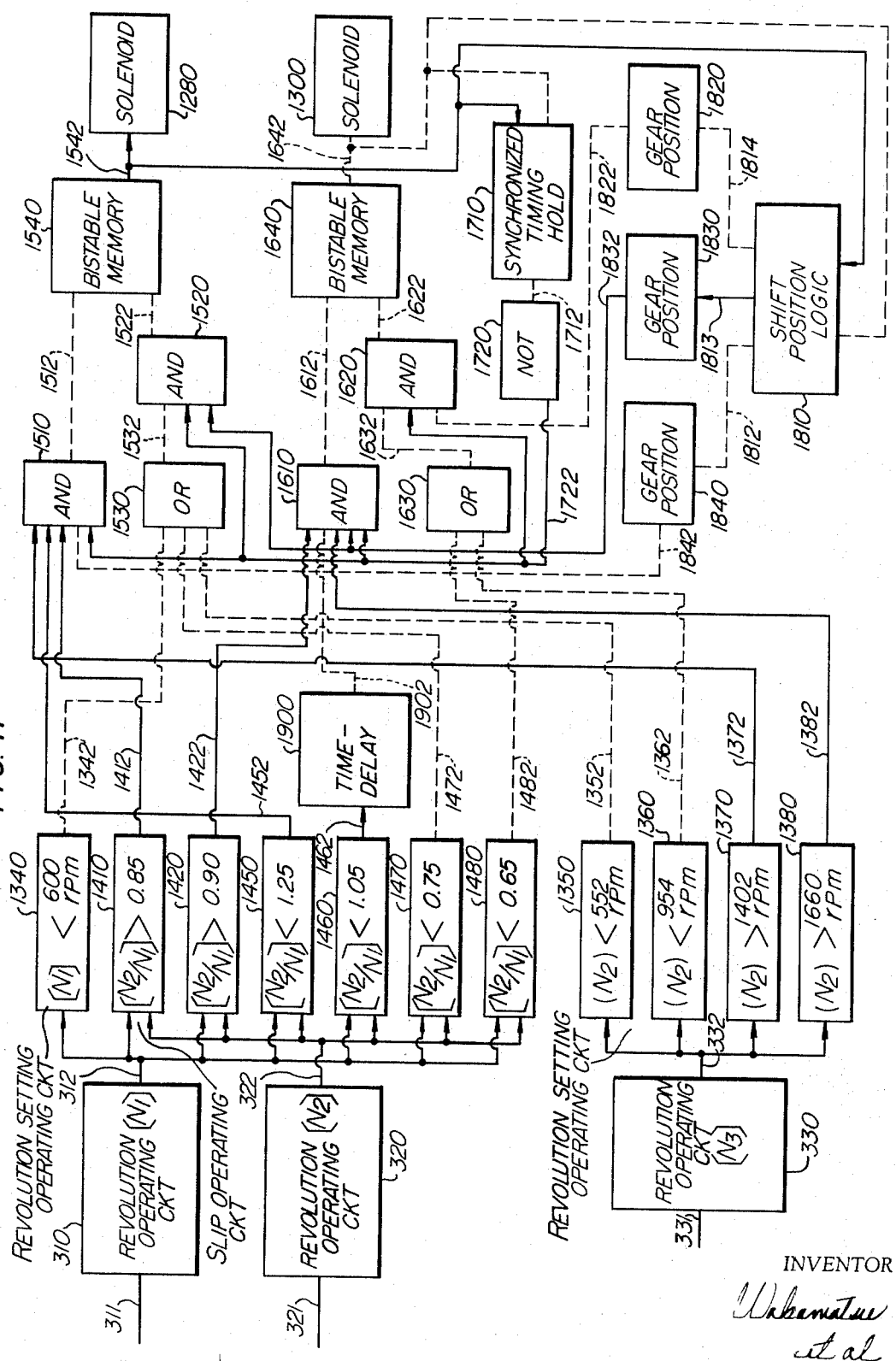
FIG. 17 is a block diagram explaining the logical operations which take place when the time-delay circuit produces no output signal during the gear changing operation from the second to the top gear.

3. Logical operations for the shift from second to top gear:

In this case, the logical operations take place upon movement of the torque converter condition into the shift region defined by solid lines in FIG. 3b, so that the solenoids 1280 and 1300 are energized to make the shift to the top gear. Thus, if the torque converter condition is at a point $a$ in FIG. 3b when driving in the second gear with the solenoid 1280 being energized, a rapid depression of the accelerator pedal moves the torque converter condition across a 1.05 slip ratio shift point or line (from second to top gear) so that the required conditions for the shift to the top gear are satisfied, that is, the AND circuit 1610 receives all of the five input signals including $[N_2/N_1] > 0.9$ signal and $[N_2/N_1] < 1.05$ signal from the slip operating circuits 1420 and 1460, $[N_2] > 1,660$ rpm signal from the revolution setting operating circuit 1380, the signal from the NOT circuit 1720 and the signal from the second gear position circuit 1830. However, the $[N_2/N_1] < 1.05$ signal from the slip operating circuit 1460 is delayed in the time-delay circuit 1900 for a time period of 0.5 seconds, for example, so that if the $[N_2/N_1] < 1.05$ signal from the slip operating circuit 1460 terminates during this delay time of 0.5 seconds, the logical product for the AND circuit 1610 fails to hold and thus only the solenoid 1280 is energized to retain the second gear as shown in FIG. 17.

Figure 18:
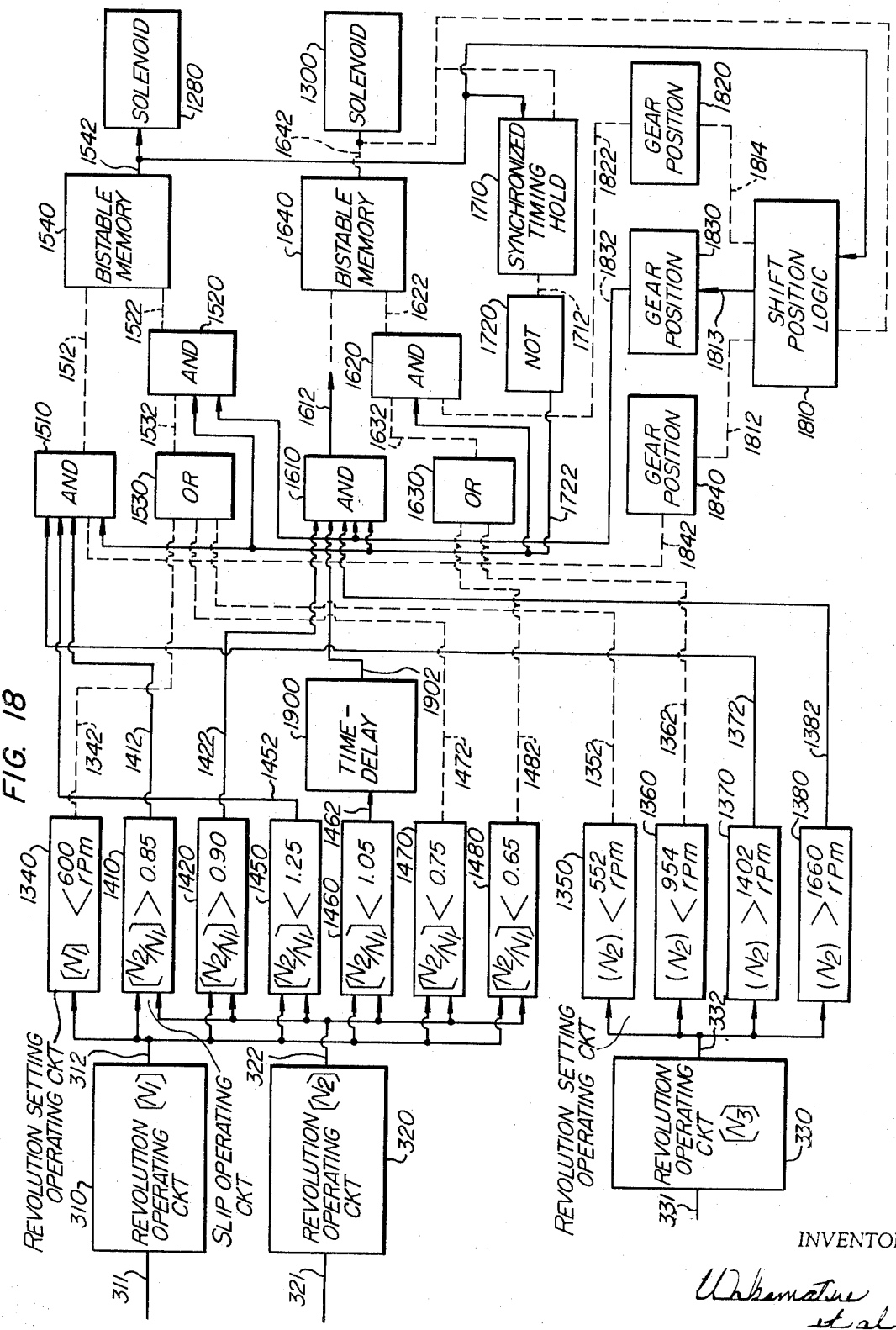
FIG. 18 is a block diagram explaining the logical operations performed when the time-delay circuit produces its output signal during the shift from the second to the top gear.
Figure 19:
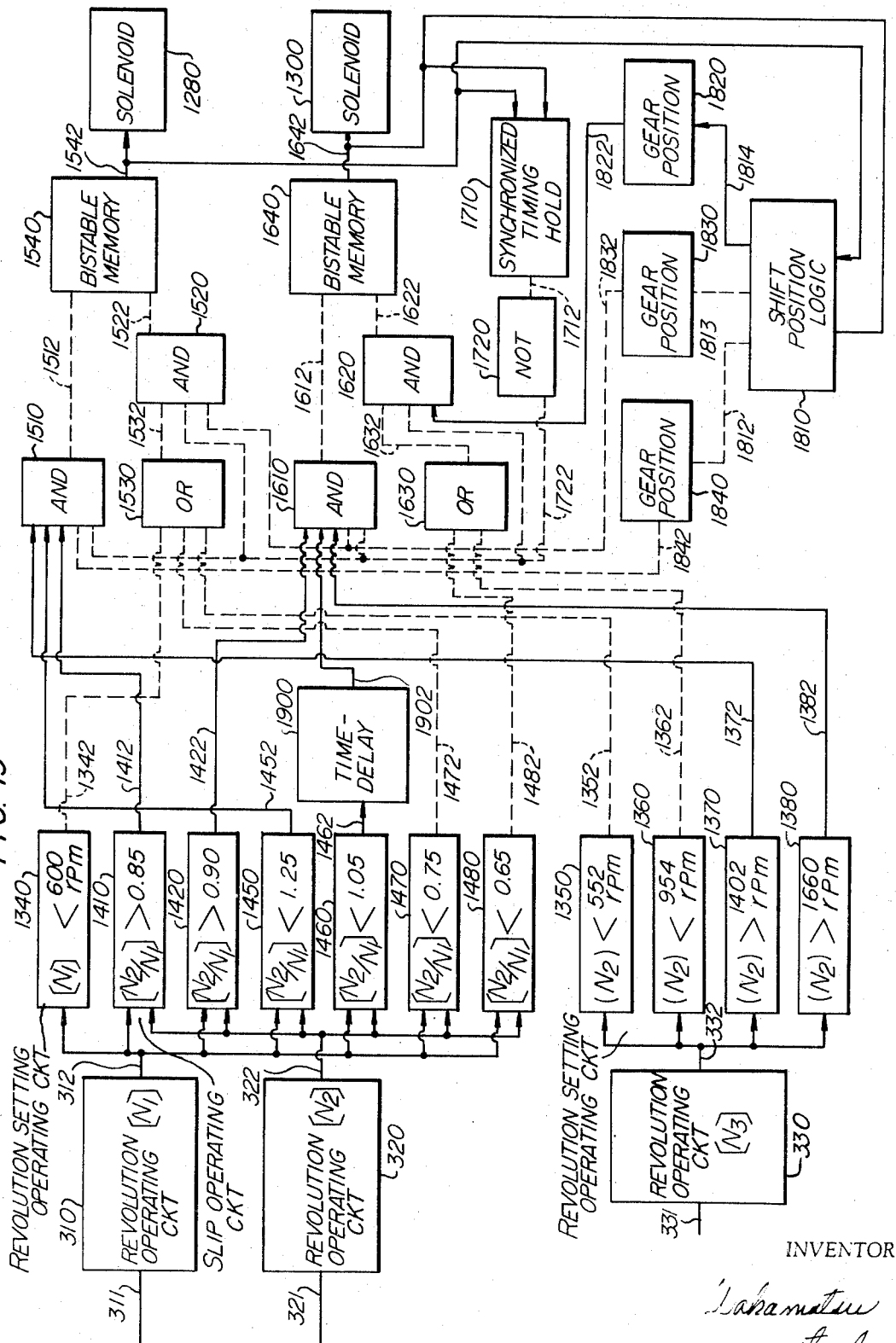
FIG. 19 is a block diagram explaining the logical operations which take place when the synchronized timing holding signal remains on following the gear changing operation from the second to the top gear.
Figure 20:
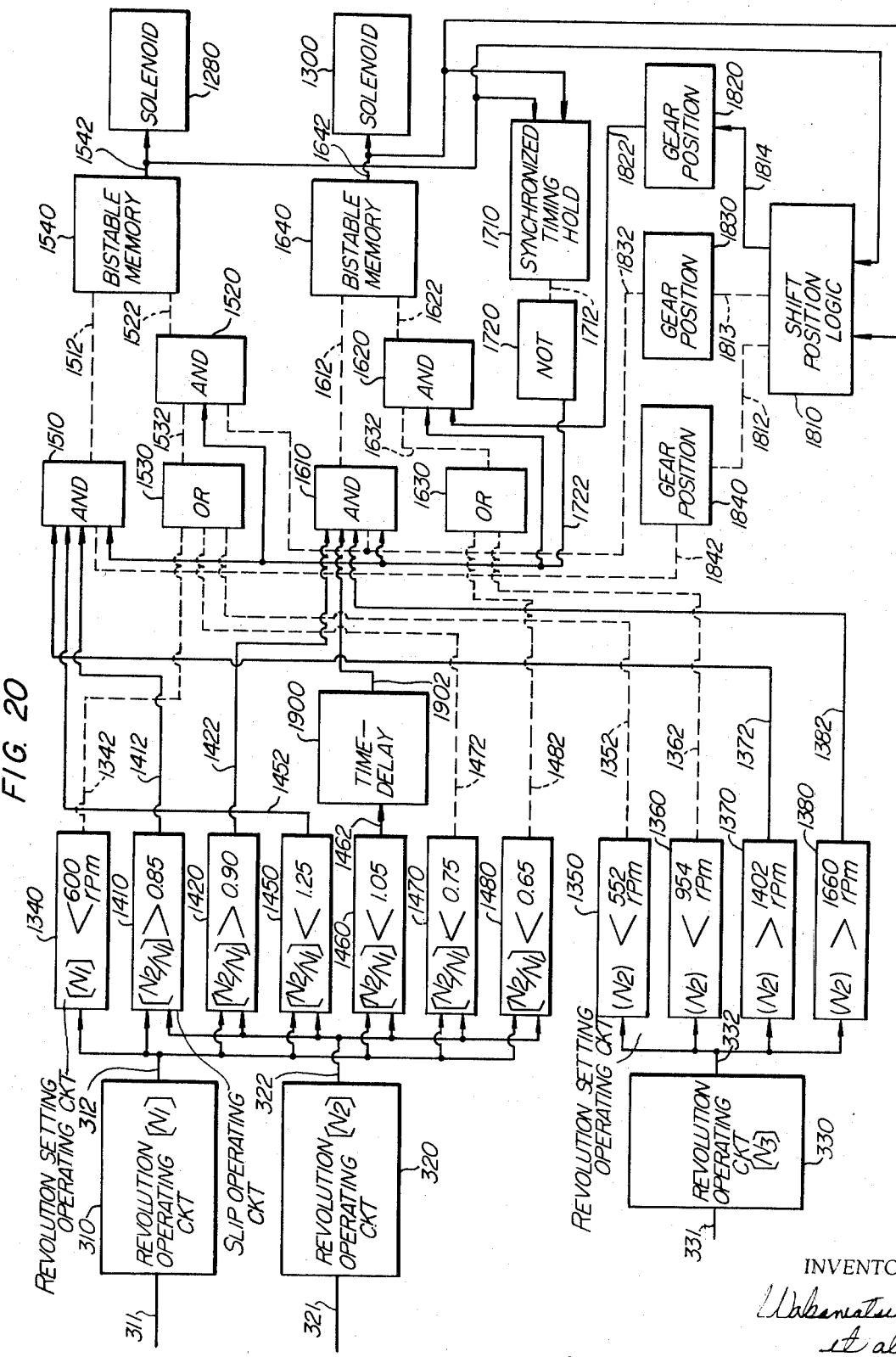
FIG. 20 is a block diagram explaining the logical operations which take place when the synchronized timing holding signal is turned off following the gear changing operation from the second to the top gear.

On the other hand, if the $[N_2/N_1] < 1.05$ signal from the slip operating circuit 1460 continues to remain on even after the lapse of the said delay time of 0.5 seconds, this $[N_2/N_1] < 1.05$ signal is applied through the time-delay circuit 1900 to the AND circuit 1610 thereby providing the logical product for the AND circuit 1610 so that, as shown in FIG. 18, the output signal from the AND circuit 1610 actuates the bistable memory circuit 1640 and the solenoid 1300 is energized to make the gear change up to the top gear. Immediately after this shift up to the top gear, as shown in FIG. 19, the signals on the lines 1542 and 1642 from the solenoids 1280 and 1300 actuate the shift position logic circuit 1810 and the top gear position circuit 1820 to produce a top gear position signal which is in turn applied to the AND circuit 1620 via the line 1822. Furthermore, during $t$ seconds immediately following the gear change up to the top gear, the NOT circuit 1720 provides no signal as shown in FIG. 19 due to the signal from the synchronized timing hold circuit 1710, while after the lapse of $t$ seconds the signal from the NOT circuit 1720 is applied via the line 1722 to the AND circuits 1510, 1520, 1610 and 1620.

Figure 21:
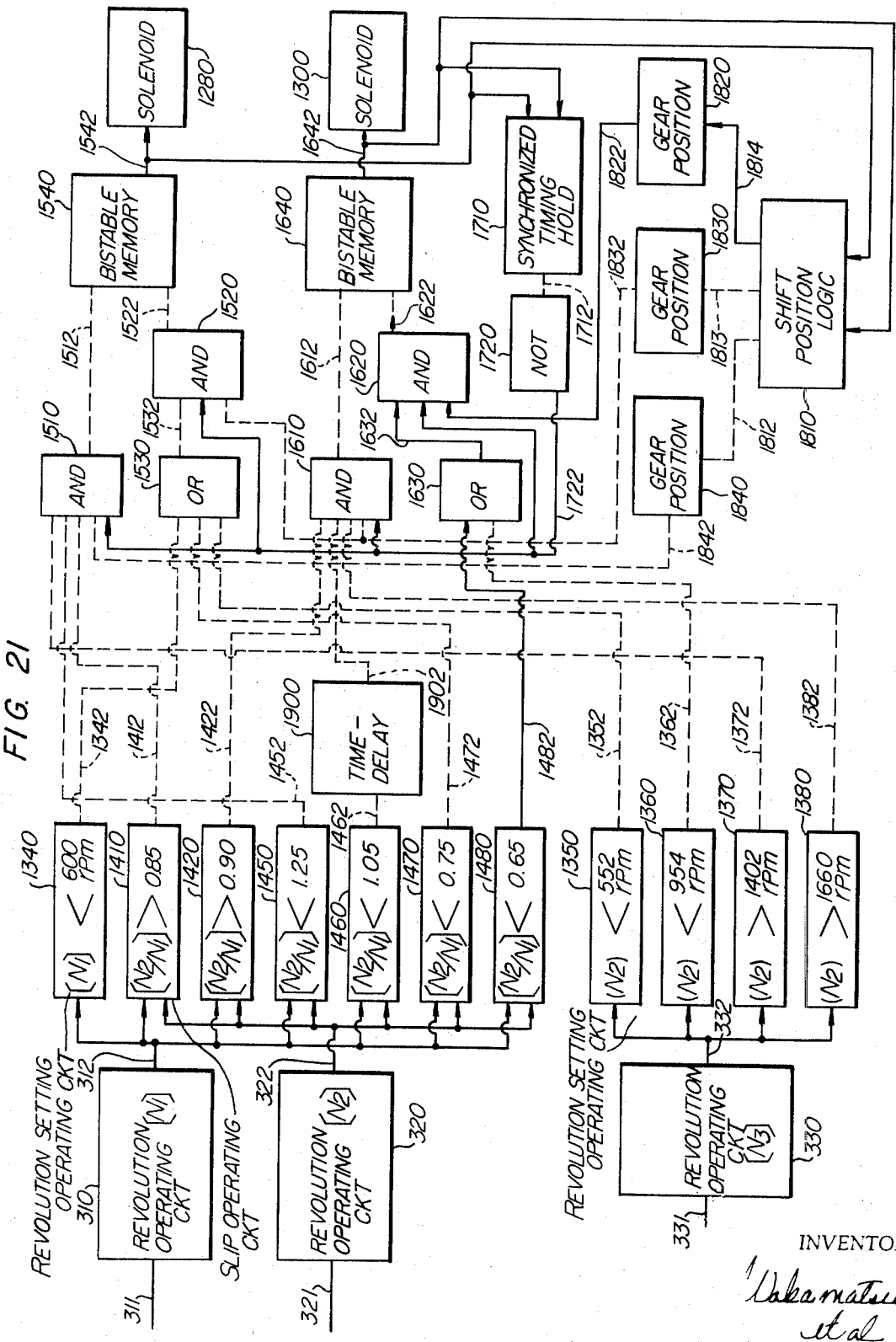
FIG. 21 is a block diagram explaining the logical operations which take place when the slip ratio becomes lower than 0.65 in the gear changing operation from the top to the second gear.
Figure 22:
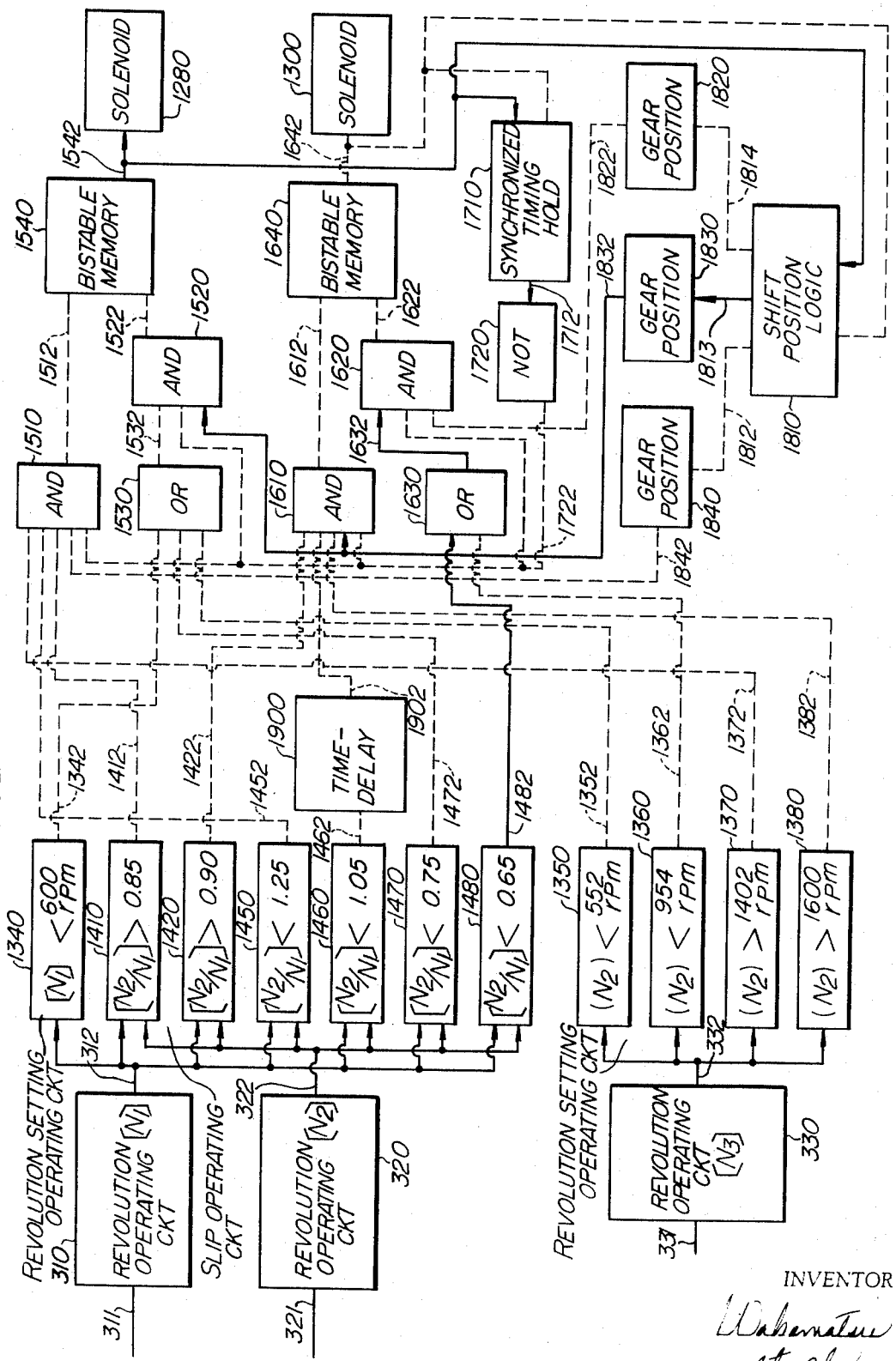
FIG. 22 is a block diagram explaining the logical operations which take place when the synchronized timing holding signal remains to be on following the gear changing operation from the top to the second gear.
Figure 23:
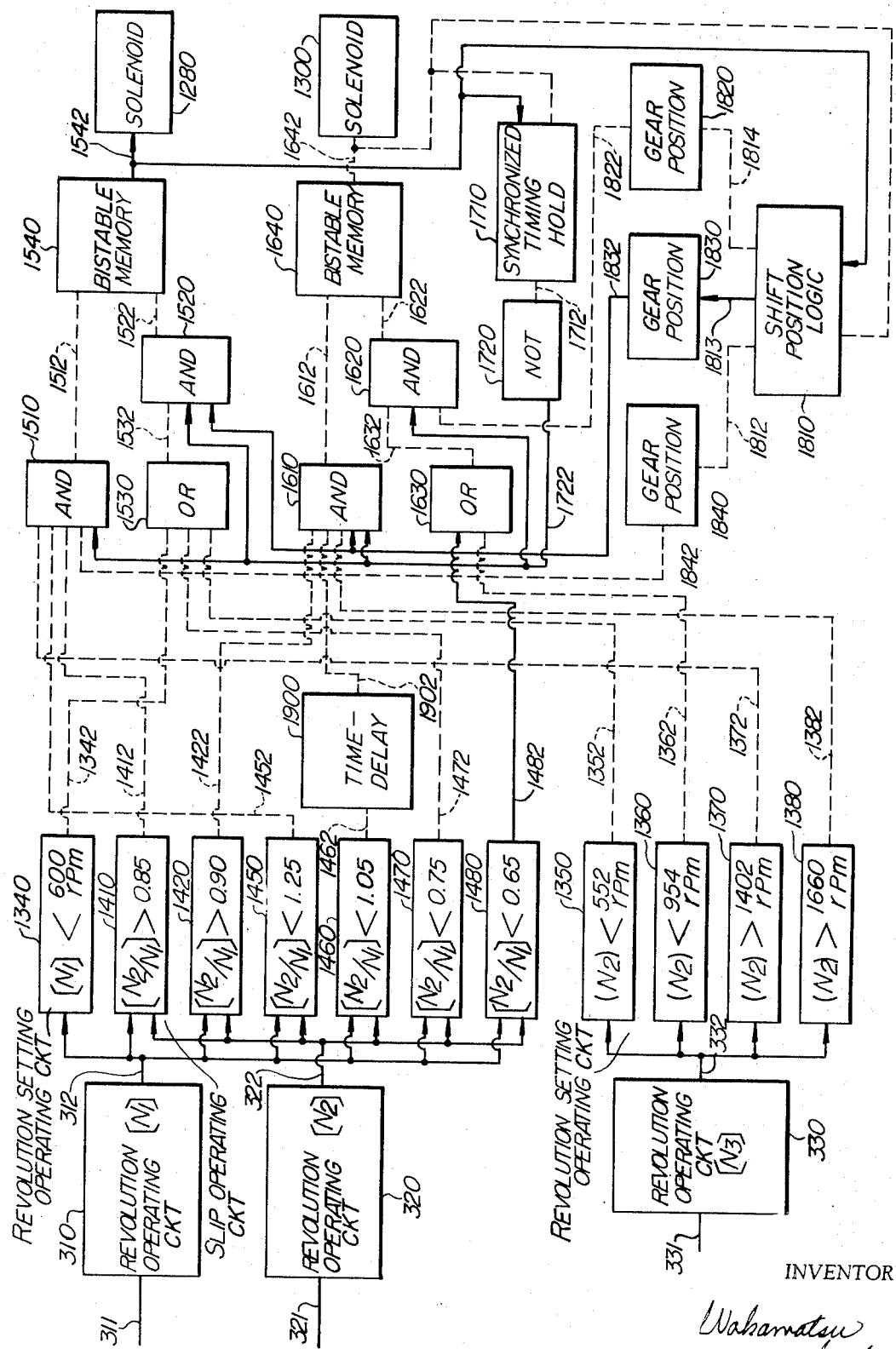
FIG. 23 is a block diagram explaining the logical operations performed after the synchronized timing holding signal is turned off following the gear changing operation from the top to the second gear.

4. Logical operations for the shift from top to second gear;

When the slip ratio $[N_2/N_1]$ becomes smaller than 0.65, for example, as shown in FIG. 21, the slip operating circuit 1480 generates a signal which is in turn applied to the OR circuit 1630 via a line 1482 and thus the output signal from the OR circuit 1630 is applied to the AND circuit 1620 via a line 1632, so that the AND circuit 1620 now receives all the required inputs including the signals already applied thereto from the NOT circuit 1720 and the top gear position circuit 1820, thereby providing a signal on the line 1622 of the circuit 1620. When this happens, as shown in FIG. 22, the signal from the bistable memory circuit 1640 is extinguished to de-energize the solenoid 1300, whereas the solenoid 1280 remains energized, so that the shift is made to the second gear. Immediately following this gear change, the signal derived from the solenoid 1280 via the line 1542 actuates the shift position logic circuit 1810 and the second gear position circuit 1830 to thereby apply a second gear position signal to the AND circuits 1520 and 1610. At the same time, there is no signal fed to the synchronized timing hold circuit 1710 from the solenoid 1300 via the line 1642 so that the output signal from the NOT circuit 1720 is extinguished for the period of $t$ seconds. After the lapse of t seconds, as shown in FIG. 23, the extinction of the signal from the synchronized timing hold circuit 1710 causes the NOT circuit 1720 to provide a signal which is applied via the line 1722 to the AND circuits 1510, 1520, 1610 and 1620.

While the AND circuits are all adapted to receive the electrical signals from the revolution setting operating circuits and the slip operating circuits in the arrangements described herein, an alternative arrangement in which electrical signals representing the loading of the internal combustion engine (intake manifold vacuum or throttle valve opening) and the engine rpm are fed to the AND circuits so as to make gear changes, is not contrary to the objectives of the present invention. Furthermore, where the gear changing operations do not require the introduction of hysteresis so as to provide different shift points for gear changes up and down respectively, only one AND circuit is needed in the logic circuitry and hence no OR circuit and bistable memory circuit are necessary. Thus, an automatic transmission system incorporating an electrical control unit comprising a single AND circuit, gear position signal generating means and synchronized timing hold means is not contrary to the objectives of the present invention.

Still furthermore, where the gear changing operations require the introduction of hysteresis, if it is not necessary that the gear changes take place when the slip ratio between the input shaft of a torque converter transmission and the input shaft of the transmission gear is smaller than a predetermined value, those electrical signals which are applied to an electrical control unit are required only to satisfy the conditions whether they are higher or lower than a predetermined value and thus they need not come within the predetermined ranges, thereby eliminating the need for any OR circuit. Thus, an automatic transmission system incorporating an electrical control unit comprising two AND circuits, a bistable memory circuit, synchronized timing hold means an gear position signal generating means is also not contrary to the objectives of the present invention.

Although in the embodiment described herein, the utility of the time-delay circuit 1900 has been discussed with reference to a case wherein the time-delay circuit 1900 is disposed at the succeeding stage to the slip $[N_2/N_1] < 1.05$ operating circuit 1460 to introduce a delay time in the gear change from the second to the top gear at the shift point (line) for the slip ratio of 1.05, similarly any other slip operating circuits having different shift points (lines) may be followed by the time-delay circuit so that the same objects can be achieved in connection with the gear changes from the low to the second gear and vice versa, and further in connection with the double, tripple and still higher gear changes.

We claim:
1. An automatic transmission system with a time-delay circuit comprising:
   a transmission having an input shaft and transmission gearing connected to a gearing shaft and being provided with a torque converter including a torque converter pump coupled to the said input shaft and a torque converter turbine coupled to the gearing shaft;
   friction engaging means for effecting gear changing engagements of said transmission gearing in said transmission;
   a hydraulic actuation circuit for controlling said friction engaging means including a shift region setting valve and a distributor valve for distributing working oil to said friction engaging means;
   first detecting means for producing an electrical signal proportional to the rotational speed of said torque converter input shaft;
   second detecting means for producing the an electrical signal proportional to the rotational speed of the gearing shaft of said transmission gearing;
   slip ratio operating circuit means connected to receive as inputs signals thereto the output electrical signals from said first and second detecting means so as to compute the ratio of the rotational speed of said torque converter input shaft to the rotational speed of the shaft of said transmission gearing for providing output signals only when said ratio exceeds at least one predetermined value and only when said ratio is less than at least one other predetermined value;
   time-delay circuit means for delaying a given one of the output signals from said operating circuit means for a predetermined time such that said given output signal is passed through said time-delay circuit means only when said given output signal has lasted longer than said predetermined time; and
   means including logic circuit means connected to said slip ratio operating circuit means and said time-delay circuit means for actuating said distributor valve of said hydraulic actuation circuit to change the gear changing engagements of the transmission gearing forthwith except when prevented at all because said given output signal from said time-delay circuit exists for less than said predetermined time or when that given output signal exists for more than said predetermined time and prevents said change in the gear changing engagements only during that predetermined time.

2. An automatic transmission system with a time-delay circuit comprising:
   a transmission having an input shaft and transmission gears having input and output shafts, said transmission being provided with a torque converter including a torque converter turbine coupled to the input shaft of said transmission gears;
   friction engaging means for effecting gear changing engagements of said transmission gears in said transmission;
   a hydraulic actuation circuit for controlling said friction engaging means including a shift region setting valve and a distributor valve for distributing working oil to said friction engaging means;

first means for producing an electrical signal proportional to the rotational spaced of the input shaft of said torque converter;

second means for producing an electrical signal proportional to the rotational speed of said input shaft of said transmission gears;

third means for producing an electrical signal proportional to the rotational speed of said output shaft of said transmission gears;

an arithmetic circuit for receiving as input signals thereto the output electrical signals from said first and second means to perform an arithmetic operation on said input signals to produce a signal indicating one of predetermined regions which corresponds to the speed ratio of the rotational speed of said torque converter input shaft to that of said transmission gear input shaft, said arithmetic circuit further receiving as its input signal the output signal from said third means and comparing it with a reference signal to produce a signal indicating the magnitude of the rotational speed of said transmission gear output shaft;

a logic circuit for receiving the signal from said arithmetic circuit to perform a logical operation thereon to produce a signal for actuating said distributor valve in said hydraulic actuation circuit; and a time-delay circuit for delaying the output speed ratio signal from said arithmetic circuit corresponding to one of said predetermined regions by a predetermined time so as to pass therethrough said output speed ratio signal from said arithmetic circuit only when said output speed ratio signal lasts longer than said delay time.

* * * * *